(12) United States Patent
Dourdeville et al.

(10) Patent No.: US 8,297,589 B2
(45) Date of Patent: Oct. 30, 2012

(54) ACTIVE VALVE AND METHODS OF OPERATION THEREOF

(75) Inventors: Theodore Dourdeville, Marion, MA (US); Frank A. Rubino, North Attleboro, MA (US); Kurt D. Joudrey, Newton, MA (US); Joseph A. Luongo, Walpole, MA (US); John Angelosanto, North Attleboro, MA (US)

(73) Assignee: Waters Technologies Corp, Milford, MA (US)

( * ) Notice: Subject to any disclaimer, the term of this patent is extended or adjusted under 35 U.S.C. 154(b) by 657 days.

(21) Appl. No.: 12/296,461

(22) PCT Filed: Apr. 11, 2007

(86) PCT No.: PCT/US2007/066412
§ 371 (c)(1),
(2), (4) Date: Apr. 8, 2009

(87) PCT Pub. No.: WO2007/121230
PCT Pub. Date: Oct. 25, 2007

(65) Prior Publication Data
US 2010/0012192 A1   Jan. 21, 2010

Related U.S. Application Data

(60) Provisional application No. 60/791,804, filed on Apr. 12, 2006.

(51) Int. Cl.
*F16K 31/02* (2006.01)
(52) U.S. Cl. .......... 251/129.19; 251/129.01; 251/129.04
(58) Field of Classification Search .................. 137/375; 251/129.01, 129.04, 129.02, 129.05, 129.14, 251/129.15, 129.19
See application file for complete search history.

(56) References Cited

U.S. PATENT DOCUMENTS

| | | |
|---|---|---|
| 2,868,494 A | 1/1959 | Kearns et al. |
| 3,855,129 A | 12/1974 | Abrahams et al. |
| 3,887,162 A | 6/1975 | Antoni et al. |
| 3,958,898 A | 5/1976 | Abrahams et al. |
| 3,981,620 A | 9/1976 | Abrahams et al. |
| 3,985,021 A | 10/1976 | Achener et al. |
| 4,018,419 A | 4/1977 | Monpetit |
| 4,044,324 A | 8/1977 | Coors |
| 4,045,343 A | 8/1977 | Achener et al. |
| 4,103,686 A | 8/1978 | LeFevre |
| 4,150,925 A | 4/1979 | Perkins |
| 4,245,963 A | 1/1981 | Hutchins et al. |
| 4,251,051 A | 2/1981 | Quenneville et al. |
| 4,347,131 A | 8/1982 | Brownlee |

(Continued)

FOREIGN PATENT DOCUMENTS
JP    57-109374    7/1982
(Continued)

OTHER PUBLICATIONS

Translation of Notice of Rejection for Japanese Patent Application No. 2009-505591, mailed Apr. 3, 2012, 4 pages.

*Primary Examiner* — Dinh Q Nguyen
*Assistant Examiner* — Justin Jonaitis
(74) *Attorney, Agent, or Firm* — Waters Technologies Corporation

(57) ABSTRACT

A valve including a linear positioning component operatively connected to a valve body and an actuating element.

17 Claims, 12 Drawing Sheets

U.S. PATENT DOCUMENTS

| | | | |
|---|---|---|---|
| 4,496,287 A | 1/1985 | Nelson et al. | |
| 4,613,290 A | 9/1986 | Evenson | |
| 4,790,351 A | 12/1988 | Kervagoret | |
| 4,848,725 A * | 7/1989 | Tibbals, Jr. | 251/129.02 |
| 4,886,114 A * | 12/1989 | Perkins et al. | 166/66.7 |
| 4,911,405 A * | 3/1990 | Weissgerber | 251/129.14 |
| 4,965,475 A * | 10/1990 | Kautz | 310/13 |
| 5,011,113 A * | 4/1991 | Stobbs et al. | 251/129.16 |
| 5,265,842 A * | 11/1993 | Sorah et al. | 251/129.08 |
| 5,494,258 A | 2/1996 | Weissgerber | |
| 5,577,970 A | 11/1996 | Smith et al. | |
| 5,605,317 A | 2/1997 | Mealy et al. | |
| 5,746,172 A | 5/1998 | Peschka et al. | |
| 6,427,970 B1 * | 8/2002 | Silva | 251/129.01 |
| 6,514,047 B2 | 2/2003 | Burr et al. | |
| 6,904,935 B2 | 6/2005 | Welty et al. | |
| 2003/0196700 A1 * | 10/2003 | Gilbert | 137/375 |
| 2004/0069305 A1 | 4/2004 | Niemela et al. | |
| 2005/0126306 A1 | 6/2005 | Wang et al. | |

FOREIGN PATENT DOCUMENTS

| | | |
|---|---|---|
| JP | 60-23375 | 2/1985 |
| JP | 2001-41334 | 2/2001 |
| JP | 2001-235052 | 8/2001 |
| WO | 2005093300 | 10/2005 |

* cited by examiner

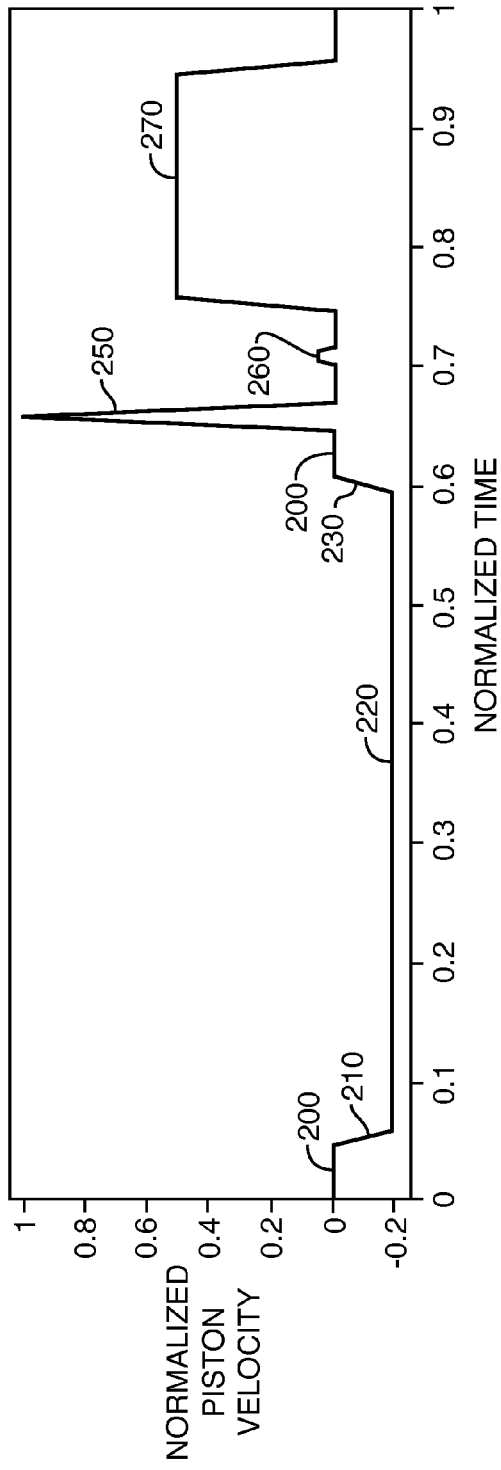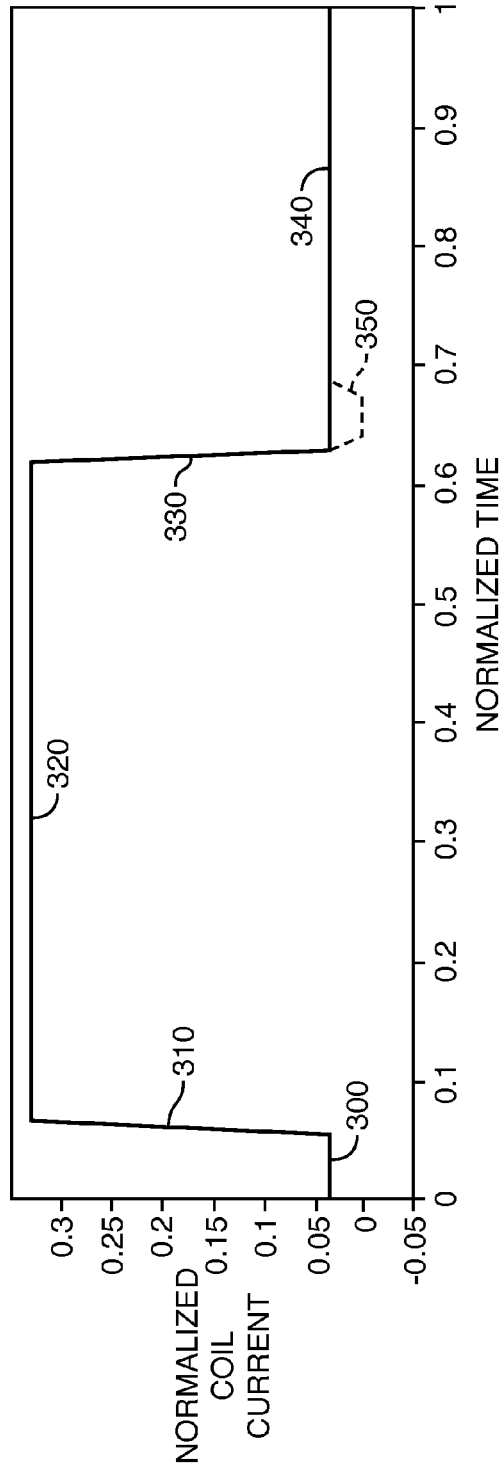

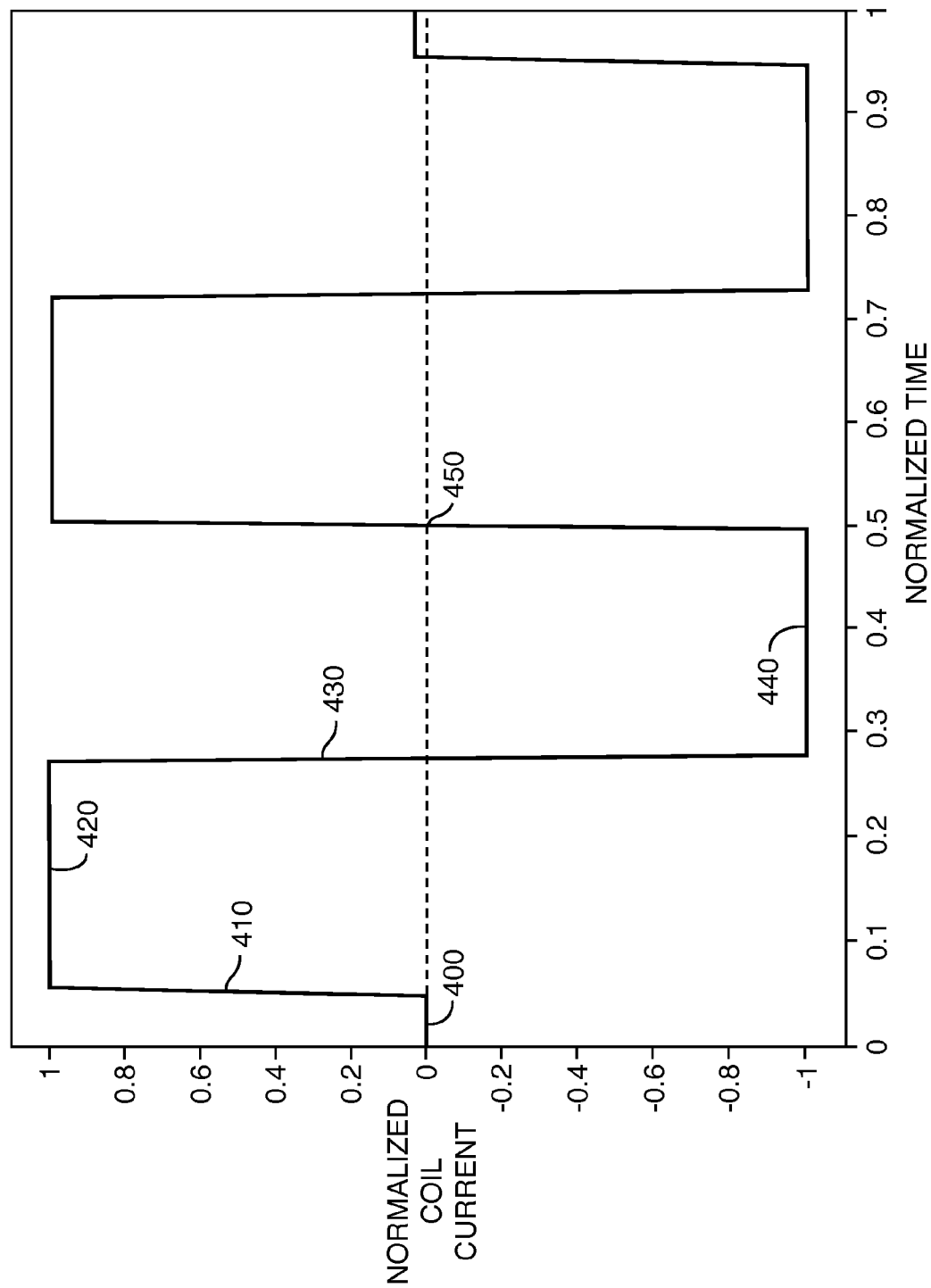

ACTIVE VALVE AND METHODS OF OPERATION THEREOF

RELATED APPLICATIONS

This application is the National Stage of International Application No. PCT/US2007/066412, filed on Apr. 11, 2007 and designating the United States, which claims priority to U.S. Provisional Application Ser. No. 60/791,804, filed on Apr. 12, 2006.

BACKGROUND OF THE INVENTION

The ball-and-seat check valve configuration is effectively an industry standard for implementing the inlet or outlet check valve functions in single-piston or multiple-piston pumps used in high-pressure liquid chromatography ("HPLC") applications. A passively-actuated ball-and-seat check valve offers relative simplicity, good mechanical stiffness, chemical inertness, adequately-swept wetted geometry, high cycle life, and reasonable sealing performance when not perturbed by environmental factors. A common material configuration associates a ruby ball with a sapphire seat, although other material combinations, including a ceramic ball or a ceramic seat, are also commonly employed. Most ball-and-seat check valves used in chromatography pumps are oriented with the flow path directed vertically upward. In this orientation, the negative buoyancy of the immersed ball results in a mild downwardly-directed force which urges the ball toward the seat. Spring preloading of the ball against the seat may be used to augment the gravitationally-derived force acting to keep the valve in a normally-closed state. A passively-actuated ball-and-seat valve used as a pump outlet check valve can incorporate a moderate spring preload, acting in the reverse- or flow-checking direction, as under normal delivery conditions, liquid pressure derived from the pump can be used to overcome the spring force and open the valve, enabling liquid delivery to the receiving system. A heavier spring preload can be useful in contributing to reliable valve closure in the presence of entrained gas bubbles, flocculent precipitates, or relatively soft contaminants.

In a passive inlet check valve, only a very light spring preload force can be applied, as the force available for opening the valve is extremely small. During the liquid intake phase of pump operation, it is generally desirable to avoid the creation of a significantly sub-atmospheric pressure condition (i.e. a pressure significantly less than 1 bar absolute) within the pump cylinder and associated fluid conduits. A cylinder pressure condition during intake which departs significantly below atmospheric pressure may trigger the outgassing from solution of dissolved gases which may be present in the mobile phase, and a cylinder pressure approaching 0 bar absolute may trigger the generation of vapor pockets, or cavitation, within the liquid. In a conventionally-aspirated HPLC pump, where the solvent inlet path to the pump intake resides at substantially atmospheric pressure or 1 bar absolute, it is therefore normal practice to configure a passive inlet check valve to operate with a threshold cracking pressure differential in the forward- or flow-enabling direction which is on the order of 10000 Pascals. Due to the very small physical size of modern HPLC ball-and-seat check valves, the effective area over which the cracking pressure differential is asserted is correspondingly small, typically in the vicinity of $1.0 \times 10^{-6}$ square meters. This configuration results in an available opening force which may be typically in the range of 0.01 to 0.02 N. This limitation on the available opening force for a passive inlet check valve results in a corresponding limitation on the closing force which can be selected for the valve.

With such small opening and closing forces available, the passive ball-and-seat inlet check valve is susceptible to failure, where the failure may originate from the valve becoming stuck in an open or a closed position. A stuck-open condition may arise when the ball is biased off the seat, and is thereby prevented from attaining the closed position, due to the presence of gas bubbles, flocculent precipitates, or other matter entrained in the mobile phase solvent stream as it transits the valve. A stuck-closed condition may arise from weak attraction or adhesion between the ball and the seat, due, for example, to electrostatic charging or to the presence of organic or inorganic residues or foreign matter in the solvent. In extreme cases, typically associated with improper system operation and storage, the ball and seat may become temporarily adhered together as a result of the precipitation and deposition of non-volatile buffer salts on the ball-seat assembly. Unlike the stuck-open conditions arising from gas bubbles or flocculent precipitate, which may be of a transient nature, an inlet check valve which is stuck in the closed position renders the pump inoperable until some mechanical intervention is made to free the valve. In an extreme exemplary condition where the precipitation, deposition, and eventual drying of non-volatile buffer salt residues on an inlet valve mechanism causes the valve to become substantially cemented closed, the assertion of an unusually large force may be required to achieve opening of the valve. However, the requirement for assertion of an unusually large force corresponds to an exceptional operating condition, which can be identified as distinct from the normal valve-opening and valve-closing conditions associated with ongoing pump delivery.

The positive-displacement pumps employed for delivery of HPLC mobile phases to a receiving system are subject to very stringent performance requirements, in that the chromatography mobile phase must be delivered with extremely high volumetric precision, at pressures which may range from approximately 7 MPa to approximately 140 MPa, or even higher. Reverse- or back-leakage of an inlet check valve degrades the performance of the pump by perturbing the relationship between piston displacement and the volumetric delivery of solvent to the system. It is therefore desirable to have the inlet check valve constructed so that in its closed state, the reverse-leakage rate, expressed as a volumetric flow rate, is on the order of nanoliters per minute or less. The high differential pressure which can exist across the inlet check valve in the reverse- or flow-checking direction, when the corresponding pump cylinder is pressurized to system pressure, or to a significant fraction of system pressure, places a significant requirement on the mechanical stiffness and general robustness of the valve. Lack of mechanical stiffness contributes to perturbing the relationship between piston displacement and volumetric delivery of solvent to the receiving system, particularly when the delivery pressure varies in response to a change in the load resistance represented by the receiving system. Change in the load resistance represented by the receiving system can occur during a chromatographic analysis as a result of a change in solvent viscosity due, for example, to the execution of a user-programmed time-varying solvent composition profile for sample elution.

One conventional configuration of an HPLC system utilizes a multi-channel solvent proportioning valve located upstream of the pump intake, such that a single high-pressure-capable HPLC pump can deliver user-configurable solvent mixtures or programmed time-varying solvent gradient compositions to a receiving system. This pump configuration is often referred to as a "low-pressure solvent gradient formation" or "low-pressure solvent gradient proportioning" system, to distinguish that configuration from a "high-pressure solvent gradient formation" system, wherein multiple high-pressure-capable pumps are used to directly generate solvent mixtures at the full system pressure. In a low-pressure solvent gradient formation system, a time-varying or a time-invariant solvent mixture is required to transit the pump. The solvent mixture formed by the interaction of the pump intake cycle with the proportioning valve cycling is susceptible to perturbation arising from non-ideal behavior of the inlet check valve. A known perturbation is the formation of an erroneous solvent composition as a result of error in the mapping or allocation of actual pump cylinder intake to one or more of the solvent channels selectable at the proportioning valve. Such errors in mapping may originate from irreproducible opening or closing behavior of the inlet check valve, or may originate from fluid volume displacement arising from motion of the valve actuator, as opposed to arising from known displacement of the pump piston. In addition, a poorly-swept pump inlet check valve can further degrade solvent gradient formation performance by contributing an undesirably large delay and mixing contribution to an intended time-varying solvent gradient profile as programmed by the user.

BRIEF SUMMARY OF THE INVENTION

Some embodiments of the invention involve an inlet check valve where the opening of the valve is accomplished deterministically by the assertion of an opening force from an actuator.

One embodiment of the valve of this invention includes a valve body having an inlet and an outlet and a passageway connecting the inlet and the outlet, a flow determining component disposed in the passageway, and capable of allowing flow when in at least one open position and of preventing flow when in a closed position, a linear positioning component operatively connected to the valve body, and an actuating element. The linear positioning component includes a stationary element capable of providing a field, wherein a force can be produced by an interaction of said field and at least one actuating signal, and a movable element capable of receiving the one or more actuating signals and capable of bi-directional linear motion, the bi-directional linear motion being incrementally controllable by the one or more actuating signals and being driven by the interaction of the one or more actuating signals and the field. The actuating element is operatively connected to the movable element and is at least partially located in the passageway and capable of operatively interacting with the flow determining component.

Methods for utilizing the valve of this invention are also disclosed.

For a better understanding of the present invention, together with other and further needs thereof, reference is made to the accompanying drawings and detailed description.

BRIEF DESCRIPTION OF THE DRAWINGS

FIG. 4b is a block diagram showing a more detailed view of relevant control features of the system of FIG. 4a;

FIG. 5a is an illustration of a pump primary piston velocity profile typically representative of that utilized in the normal delivery mode of a pump constructed according to any of FIGS. 3 and 4a-c;

FIG. 5b is an illustration of a voice coil drive-current profile typically representative of that used in conjunction with the primary piston velocity profile of FIG. 5a;

FIG. 5c is an illustration of an alternate voice coil drive-current profile representative of that used in conjunction with the primary piston velocity profile of FIG. 5a;

FIG. 6 is an illustration of a voice coil drive-current profile typically representative of that used in the startup sequence of a pump constructed according to any of FIGS. 3 and 4a-c, or as utilized within a diagnostic or other specialized mode of operation of a pump constructed according to any of FIGS. 3 and 4a-c;

DETAILED DESCRIPTION OF THE INVENTION

One embodiment of the valve of this invention includes a valve body having an inlet and an outlet and a passageway connecting the inlet and the outlet, a flow determining component disposed in the passageway, and capable of allowing flow when in at least one open position and of preventing flow when in a closed position, a linear positioning component operatively connected to the valve body and an actuating element. The linear positioning component includes a stationary element capable of providing a field, wherein a force can be produced by an interaction of said field and at least one actuating signal, and a movable element capable of receiving the one or more actuating signals and of bi-directional linear motion, the bi-directional linear motion being incrementally controllable by the one or more actuating signals and being driven by the one or more actuating signals and the field. The actuating element is operatively connected to the movable element and is at least partially located in the passageway and capable of operatively interacting with the flow determining component.

Figure 1:
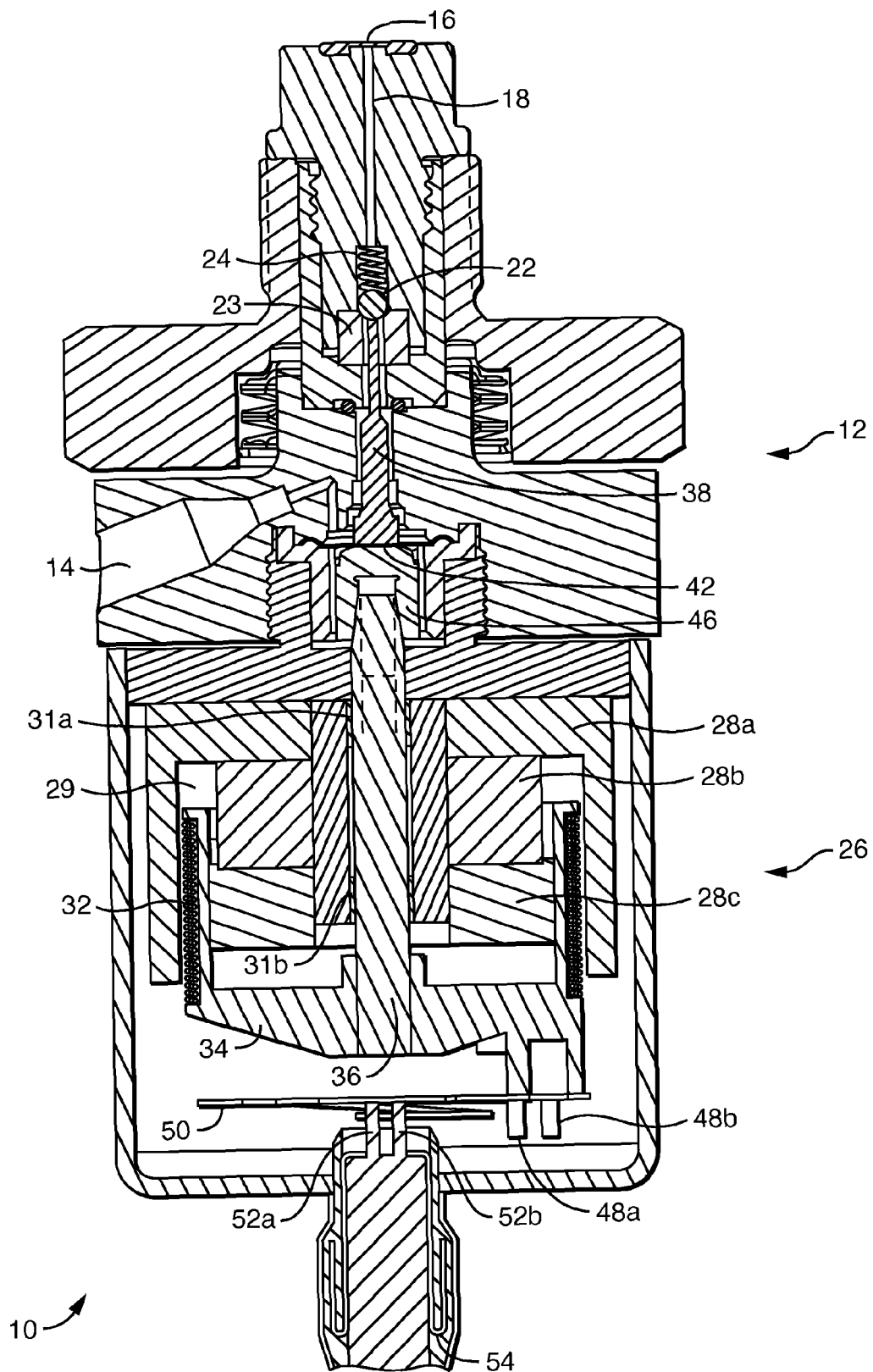
FIG. 1 is a section view of an embodiment of a valve according to the present invention.

An embodiment 10 of the valve of this invention is shown in FIG. 1. Referring to FIG. 1, an embodiment 10 of the valve of this invention has a valve body 12 comprising an inlet 14, an outlet 16 and a passageway 18 connecting the inlet 14 and the outlet 16. The valve 10 also has a flow determining component 22, a check valve ball in the embodiment shown in FIG. 1, disposed in the passageway 18. The flow determining component 22 is capable of allowing flow when in at least one open position displaced away from seat 23. The flow determining component 22 is capable of preventing flow when in a closed position, where the flow determining component 22 resides in sealing engagement with seat 23. The embodiment 10, shown in FIG. 1, also has a biasing component 24, a preload spring in the embodiment shown, also disposed in the passageway 18. The biasing component 24 exerts a force which acts to urge the flow determining component 22 toward the closed position.

The embodiment 10 of the valve of this invention also includes a linear positioning component 26, a voice coil motor in the embodiment shown, operatively connected to the valve body 12. The linear positioning component 26 includes a stationary assembly 28a, 28b, 28c, comprising a substantially radially-symmetric pot or cup in the embodiment shown. In a one embodiment, pole pieces 28a and 28c sandwich a ring magnet 28b, and may be further shaped for the purpose of guiding the flux path of ring magnet 28b so as to produce a generally radially-directed magnetic field across at least some portion of an annular cavity or slot 29.

The voice coil winding 32 is disposed within slot 29. The coil is typically constructed from insulated copper wire (although other constructions are within the scope of this invention), and is wound upon a bobbin or moveable element 34.

The moveable element 34 is constrained to operate along a path which is substantially axially-concentric within the stationary assembly 28a, 28b, 28c. This axially-concentric operation is achieved through the use of linear bearing elements 31a, 31b, which guide the motor shaft 36, onto which moveable element 34 is permanently affixed.

Moveable element 34 also provides a mounting point for respective electrical terminals 48a, 48b which reside in electrical communication or continuity with respective ends of voice coil winding 32. Electrical terminals 48a, 48b also reside in electrical communication with respective electrical conduits sandwiched within a polyimide-encapsulated or laminated flexible circuit element 50.

Flexible circuit element 50 provides electrical continuity from respective terminals 48a, 48b to corresponding electrical conductors 52a, 52b located within a stationary bulkhead connector 54. In this manner, non-commutating electrical continuity is maintained between the moving voice coil winding and a stationary bulkhead electrical termination, for the purpose of communicating an actuating signal to the winding from a drive circuit (not shown).

When at least one actuating signal in the form of an electric current is caused to flow through voice coil winding 32, a resultant force is generated in a direction parallel to the axis of the motor shaft, in accordance with the Lorentz force principle. The resultant axially-directed force, which is imparted by the voice coil winding 32 to the moveable element 34, and thence to the motor shaft 36, is of a magnitude which is proportional to the magnitude of the electric current and to the magnetic field intensity which is asserted within the relevant region of slot 29. The sign or direction of the axial force produced by voice coil winding 32 is governed by the direction of the electrical current supplied to the coil.

In an appropriately constructed voice coil motor, the voice coil current and the resultant axial force are substantially related by a simple constant of proportionality (the "force constant"), where the constant is substantially independent of the axial displacement of the coil over a defined operating range. Voice coil motors conforming to this general pattern of construction and principle of operation are commercially available from multiple vendors, and are often referred to as Lorentz actuators or Lorentz devices in recognition of their underlying operating principle. Voice coil actuators are also commercially available in a rotary actuation form, where the assembly comprising the coil and moveable element is typically mounted to a rotary support bearing or bushing, and is constrained to sweep through a limited actuation arc.

The permanent magnet slot may be disposed linearly, or along a corresponding arc of a circle.

The bipolar linear proportional nature of the current-to-force relationship obtained with voice-coil-based actuators makes them generally highly controllable, and has caused them to become actuators of choice in applications such as read-write head positioning within computer disk drives, or in audio speakers.

In some applications, it is typical for the voice coil bobbin or moveable element to be supported with a diaphragm suspension as opposed to a mechanical linear bearing. A diaphragm suspension maintains the radial or lateral alignment of the coil while substantially eliminating the friction contribution of the axial linear bearing. The diaphragm also introduces a restoring force which is related to the extent of deflection of the diaphragm, and to its materials and manner of construction.

The linear voice coil motor is a member of the group of devices referred to generally as linear motors. It is a non-commutated electromagnetic device capable of limited-stroke operation. A variant of the linear voice coil motor described briefly above is the rotary voice coil motor, the actuation path of which subtends an arc of a circle. It is a non-commutated electromagnetic device capable of limited-arc operation. Depending upon the displacement requirements and the geometry available for the actuator, situations exist where either a linear or a rotary voice coil motor could be used. Other linear motor types, such as those developed from step or brushless DC motor technology (effectively rotary motors opened out to a flat configuration) encompass some of the attributes cited above, and might be substituted for the voice coil motor. The maintenance of any required radial or lateral alignment of the drive mechanism, while attaining a defined extent of axial displacement of the drive mechanism, can be achieved by the provision of plain bearings (bushings), rolling-element bearings, diaphragms, flexures, or other forms of suspension, used individually or in combination, without departing from the scope of the present invention.

The embodiment 10 shown in FIG. 1 also includes an actuating element 38, a pushrod actuator, operatively interacting with the motor shaft 36, the actuating element 38 being at least partially located in the passageway 18 and capable of operatively interacting with the flow determining component 22. Embodiments in which the actuating element 38 and the motor shaft 36 are integral parts of the same component, or are mechanically assembled to achieve the behavior of an integrated component, are also within the scope of this invention.

Figure 2:
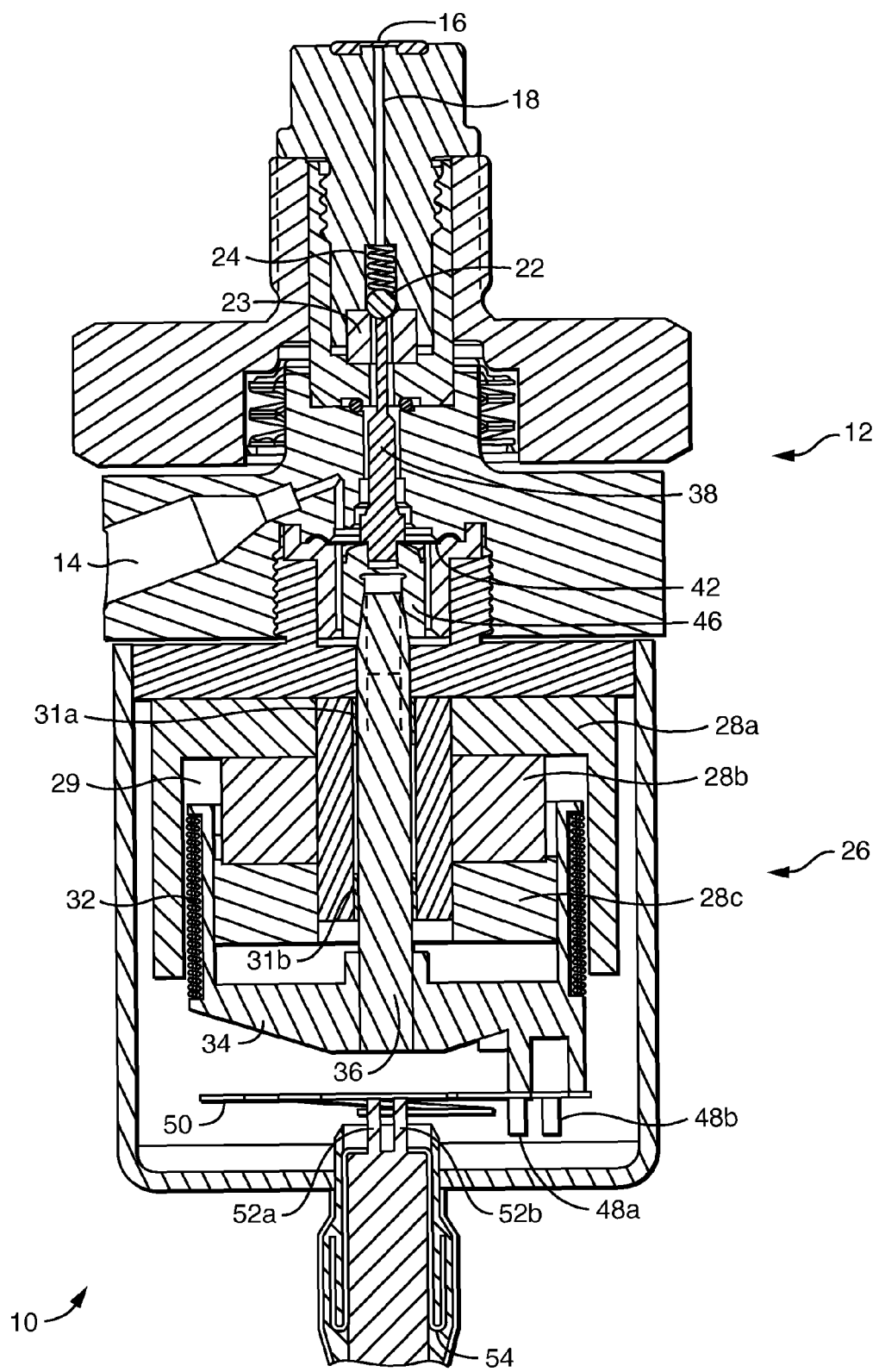
FIG. 2 is a section view of another embodiment of a valve according to the present invention.

The embodiment 10 shown in FIG. 1 also includes an isolation component 42, a solvent isolation diaphragm in the embodiment shown, capable of isolating the fluid-filled passageway 18 from the movable element 34 and other components of the voice coil motor. In FIG. 1, voice coil motor shaft 36 is not continuous with actuating element 38, resulting in configuration termed herein a "segmented pushrod configuration". Motor shaft 36 may be brought to bear against isolation component 42 by way of an intervening platen 46. Platen 46 is threadedly engaged with motor shaft 36, and provides a mechanically stiff and appropriately finished surface for compressional engagement with isolation component 42. Platen 46 also provides a relatively non-critical rearward travel stop for the moving elements of the voice coil motor. An alternative arrangement, depicted in FIG. 2, provides for a substantially direct mechanical connection between actuating element 38 and motor shaft 36 through isolation component 42, and is referred to herein as a "non-segmented pushrod configuration".

Embodiments in which the isolation component 42 is absent, that is embodiments using wetted coils, are also within the scope of this invention. In those embodiments, for example, but not limited only to, a substantially chemically-inert tantalum wire can be used as a coil winding material, with a solvent-resistant polymer layer such as a polyimide or fluorocarbon coating used to achieve electrical insulation between adjoining coil winding wraps, and to achieve electrical insulation between the coil and the solvent or mobile phase. The materials or surface coatings of the remaining wetted parts are also selected so as to be compatible with the mobile phases in use.

More generally, some embodiments include wear- and/or corrosion-resistant coatings on one or more components. Such components are, for example, subject to sliding, vibration, impact or other sources of wear. For example, as described in more detail below, surfaces that potentially move relative to a neighboring surface are subject to potential wear and, in some embodiments, are coated with a wear-resistant coating to reduce wear and/or to reduce corrosion of an underlying material. For example, in some embodiments, the actuating element 38 is coated with a material, such as diamond or diamond-like carbon ("DLC"). The coating reduces wear of the actuating element 38 and protects some underlying materials, such as stainless steel, from corrosion due to loss, in a wet environment deficient in oxygen, of a normally protective surface layer, such as an oxide layer.

In segmented pushrod embodiments where the movable element 34 is incompletely coupled to the flow determining component 22, such that moveable element 34 provides only a unidirectional force input to actuating element 38 and flow determining component 22, backlash gap management becomes an important part of the control environment, and is discussed in detail further below.

FIG. 2 depicts an alternative embodiment of a valve according to the current invention, which differs from the embodiment depicted in FIG. 1 in that a non-segmented pushrod configuration is employed. Components having similar function to those of FIG. 1 are shown with identifying enumeration as used in FIG. 1. Actuating element 38 is mechanically coupled by threaded engagement through an aperture in isolation element 42 to platen 46. Platen 46 provides mechanical coupling through to motor shaft 36 by way of its threaded engagement with the motor shaft.

The diaphragm comprising solvent isolation element 42 is sandwiched tightly between the mechanically-coupled actuating element 38 and platen 46. The diaphragm material chosen for solvent isolation element 42 may be a metal selected to support a brazed or electron-beam welded seal augmenting the mechanical compression at the sealing interface, or may be a thermoplastic polymer selected to support thermal bonding to the adjoining metallic actuator parts at the sealing interface, or may be any combination of metallic and polymeric layers chosen to achieve a desired quality of either compression-gasketed or bonded sealing.

Figure 3:
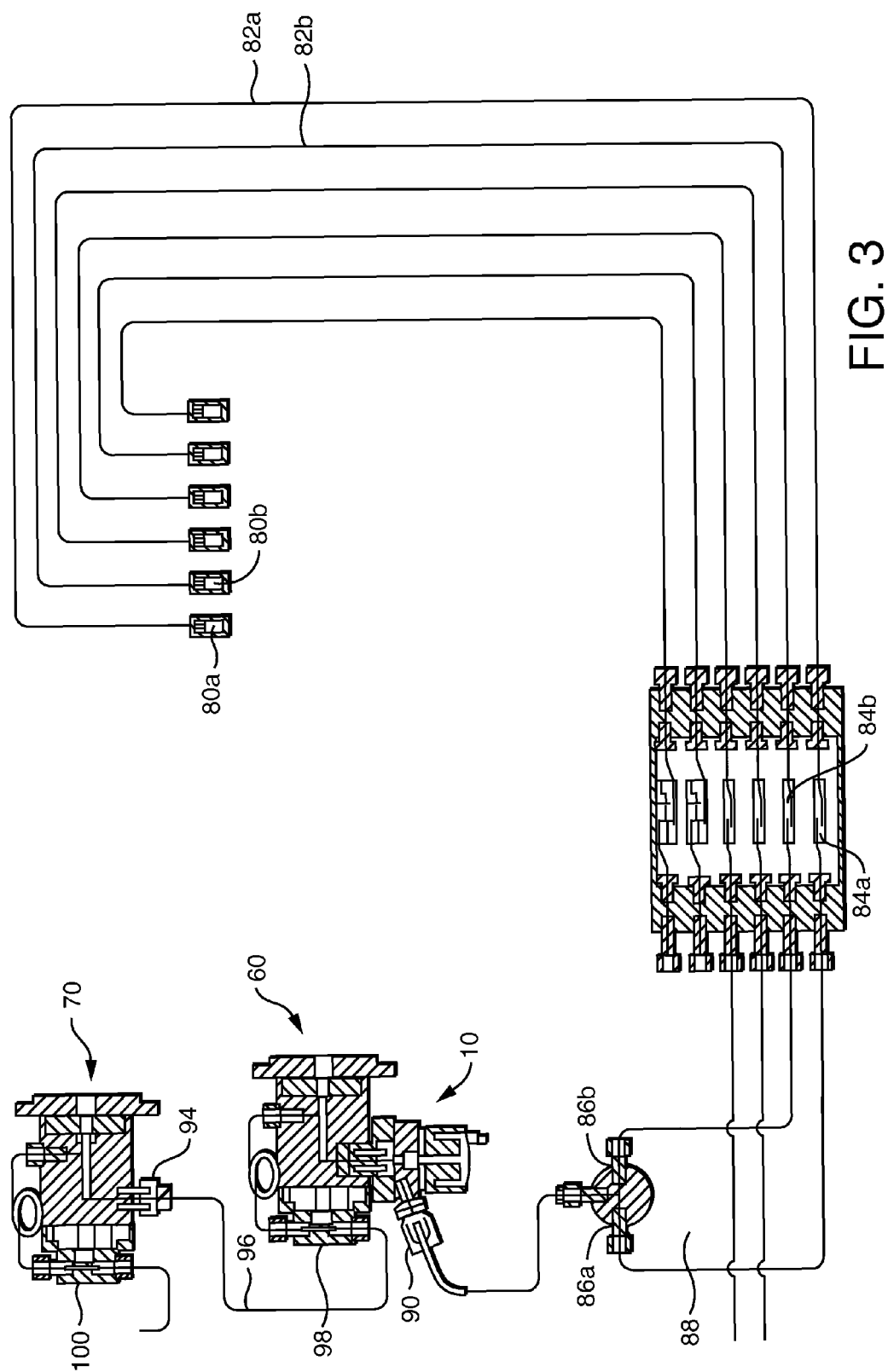
FIG. 3 is a diagrammatic representation of the wetted path of a two-piston, serial-flow pump utilizing an embodiment of the valve of this invention.

FIG. 3 depicts the wetted path of a two-piston, serial-flow HPLC pump configured with an inlet check valve according to the current invention. The pump wetted path implementation comprises a primary cylinder assembly 60 and an accumulator cylinder assembly 70. Primary cylinder assembly 60 is fitted with an inlet check valve 10 embodied according to FIG. 1. The independent, motorized linear drive mechanisms associated with the pistons employed in primary cylinder assembly 60 and accumulator cylinder assembly 70 have been removed for clarity. Mobile phase solvent from respective solvent reservoirs 80a and 80b is conveyed through respective solvent reservoir tubing lines 82a and 82b to respective solvent degasser chambers 84a and 84b. Solvent emerging from respective degasser chambers 84a and 84b is conveyed to respective ports 86a and 86b of solvent selection valve 88.

Solvent selection valve 88 may be a solenoid-actuated two-way diverter valve which allows the user, by way of the pump controller (not shown), to select which of two respective solvents will be provided to the pump for a specified phase of pump operation. Alternatively, solvent selection valve 88 may comprise a multi-solenoid, multi-channel solvent proportioning valve which enables any one of N solvent channels to be placed in communication with inlet valve 10, and thus with the pump primary cylinder. Such valves are conventional valves, an example of which is utilized in a commercial product sold by Waters Corporation under the trademarked model name ALLIANCE. Based on the state of selection valve 88, solvent from one of the reservoirs 80a and 80b will be communicated to the pump inlet valve 10 and thence to the pump primary cylinder assembly 60.

The solvent intake path of the pump further includes a frit filter assembly 90 as known in the art, which is used to trap foreign particulate material which may have entered the solvent intake path, typically from the solvent reservoir. Additional frit filtering (not shown) may be employed on the solvent reservoir tubing lines at the reservoir end, also as known from existing art.

A spring-loaded passive check valve 94 is used in this illustrative embodiment at the downstream end of the high-pressure fluid conduit 96 which connects the outlet of primary cylinder pressure transducer 98 with the inlet of accumulator cylinder assembly 70. Because this region of the pump fluid path normally resides at high pressure, and because the pump primary cylinder pressure is available to forcibly expel liquid toward the accumulator, a meaningful spring preload force can be used within passive check valve 94 to optimize its behavior.

The fluid-filled or wetted internal volume of pump primary cylinder assembly 60 remains in fluid communication with pump primary cylinder pressure transducer 98. Pump accumulator cylinder assembly 70 is provided with a pressure transducer 100 which always remains in fluid communication with the fluid-filled or wetted internal volume of the accumulator cylinder. Respective pressure transducers 98 and 100 allow the pump controller to monitor the internal cylinder pressure of the respective primary and accumulator cylinders throughout the cycle of pump operation, without regard to the open or closed status of any valves. This capability enables, for example, the pump controller to detect the compression and the decompression of the pump primary cylinder contents in response to pump primary piston motion, and in particular allows the pump controller to detect appropriate points in the primary pump cycle for triggering the inlet valve 10 to open or close. The operation of inlet valve 10 within the context of the pump cycle of primary cylinder assembly 60 is illustrated in the subsequent Figures and associated text.

Figure 4A:
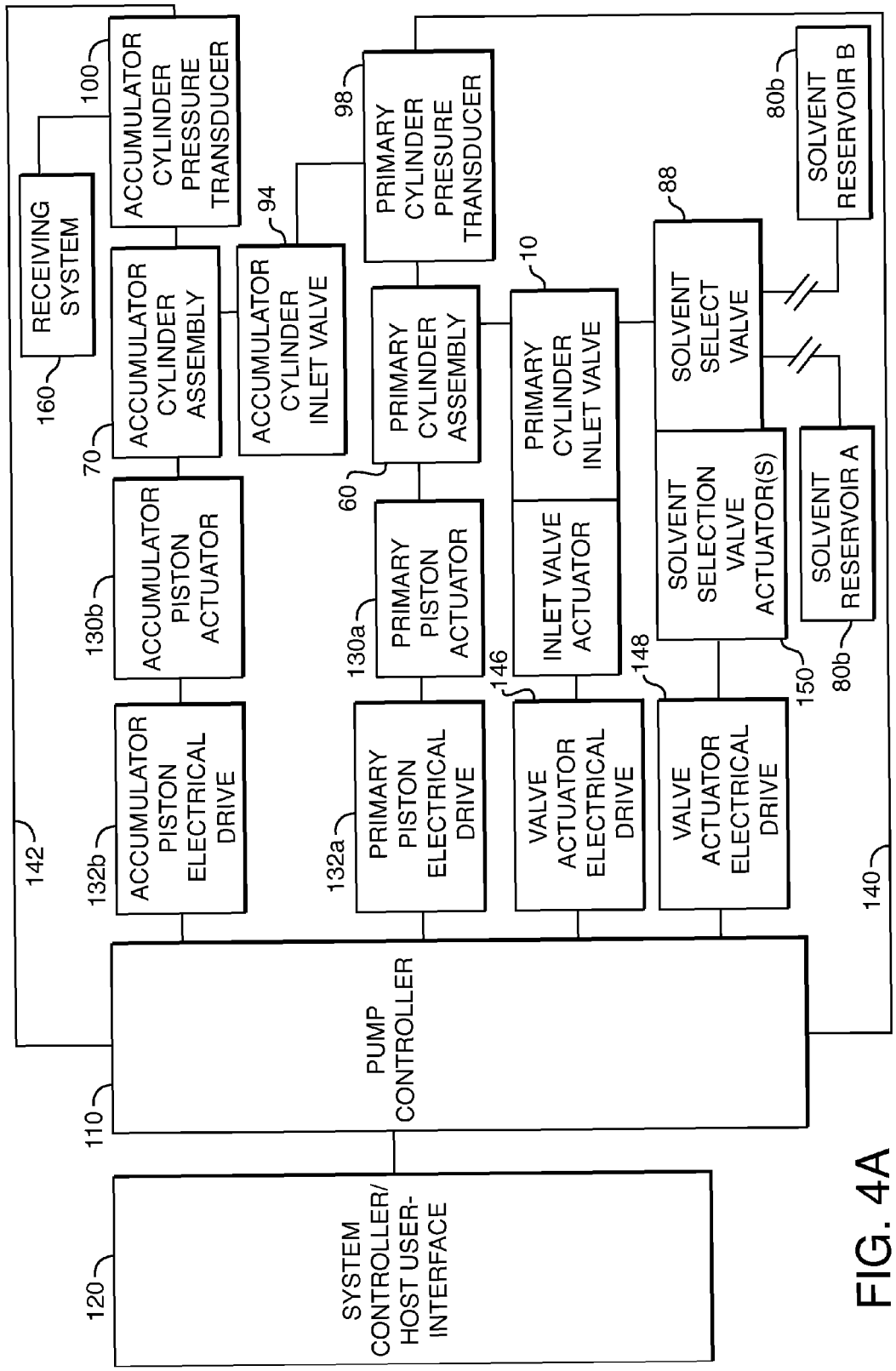
FIG. 4a is a block diagram representing the high-level control features of a two-piston, serial-flow pump utilizing an embodiment of the valve of this invention.

FIG. 4a depicts a block diagram of a system constructed according to FIG. 3, intended to illustrate certain high-level control features of the system relevant to the operation of an inlet valve according to the invention. In this illustrative embodiment, pump controller 110 is implemented as a microcontroller or microprocessor responsible for coordinating the execution of actions relating to pump piston and valve operation. Pump controller 110 may be slaved, or hierarchically responsive to, a system controller 120 which implements the human user interface. System controller 120 is typically implemented as a host computer, which interfaces to the pump controller 110 by an electrical interface and software protocol as known in the art. Pump controller 110 maintains independent control over respective primary and accumulator cylinder piston actuators 130a, 130b by way of respective electrical motor drives 132a, 132b. Respective primary and accumulator piston actuators 130a and 130b generate respective piston displacements within respective primary cylinder assembly 60 and accumulator cylinder assembly 70.

The primary cylinder pressure transducer 98 and accumulator cylinder pressure transducer 100 remain in constant fluid communication with respective primary and accumulator cylinder assemblies 60 and 70, and are capable of reporting respective signals representative of primary and accumulator cylinder pressure to pump controller 110 by way of respective primary cylinder pressure signal path 140 and accumulator cylinder pressure signal path 142. The operation of primary cylinder inlet valve 10 is controlled by pump controller 110 by way of inlet valve actuator electrical drive 146. Correspondingly, the operation of solvent selection valve 88 is controlled by pump controller 110 by way of solvent selection valve actuator electrical drive 148 and solvent selection valve actuator 150. Depending upon the type of valve employed to serve the solvent selection function, a single actuator and a single actuator electrical drive may be used, or a multi-channel actuator and multi-channel electrical drive may be used. Accumulator cylinder inlet valve 94 is a passive valve in this illustrative embodiment.

The overall function of the above-referenced blocks is to bring about controlled volumetric delivery of at least one mobile phase solvent selected from respective solvent reservoirs 80a, 80b, to a receiving system 160, at a flow rate and solvent composition as specified by the user at the user interface of system controller 120.

Figure 4B:
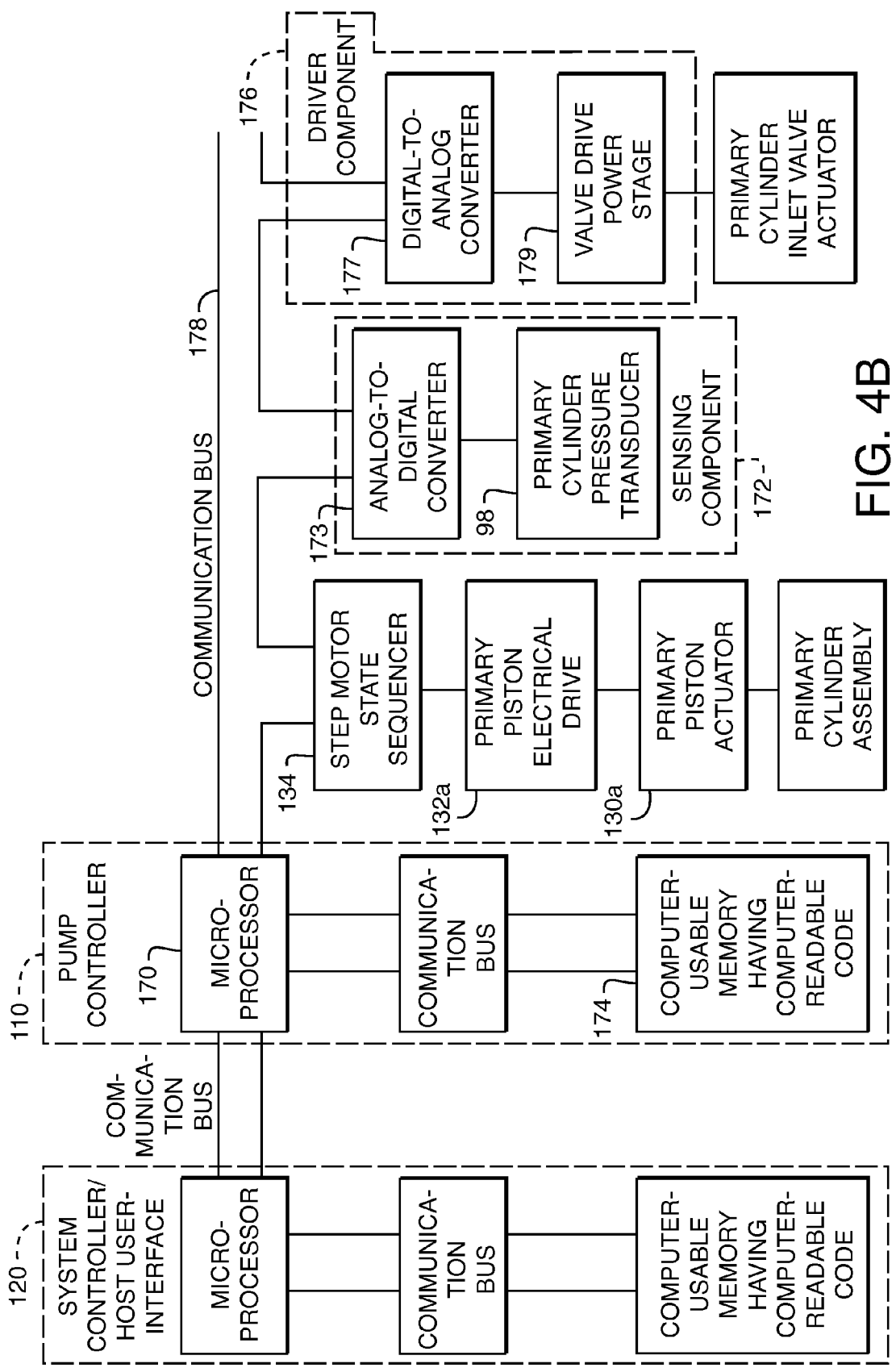

FIG. 4b is a block diagram showing in greater detail an illustrative embodiment of the control and communication pathways implemented to effect control of a pumping system incorporating an inlet valve according to the present invention. A microprocessor 170 within pump controller 110 accesses computer-useable memory 174 by way of at least one communication bus. Microprocessor 170 also communicates with a primary cylinder pressure sensing component 172 and an inlet valve driver component 176. Driver component 176 may be implemented as a digital-to-analog converter or DAC 177 responsive to a digital control input from microprocessor 170, which is communicated over communication bus 178.

In an illustrative embodiment, DAC 177 outputs an analog voltage signal to inlet valve drive power stage 179. Also in this illustrative embodiment, power stage 179 may be implemented as a linear power amplifier or as a switch-mode power amplifier. Power stage 179 accepts as input an analog output voltage signal from DAC 177, and generates from that control voltage signal a corresponding voice coil drive signal. Sensing component 172 allows the microprocessor 170 to receive input from at least a primary cylinder pressure transducer 98. In this illustrative embodiment, pressure transducer 98 emits an analog output voltage signal proportional to primary cylinder pressure. This analog output voltage signal is digitized by analog-to-digital converter or ADC 173. The binary output of ADC 173 may be read by the microprocessor 170 over communication bus 178. Microprocessor 170 also asserts control over a primary piston actuator 130a by way of a primary piston electrical drive 132a. Typically the microprocessor interface to electrical drive 132a is implemented as a state sequencer 134 accessed via communications bus 178, allowing microprocessor 170 to determine the step rate and step direction of a step motor integral to the primary piston actuator 130a.

Figure 4C:
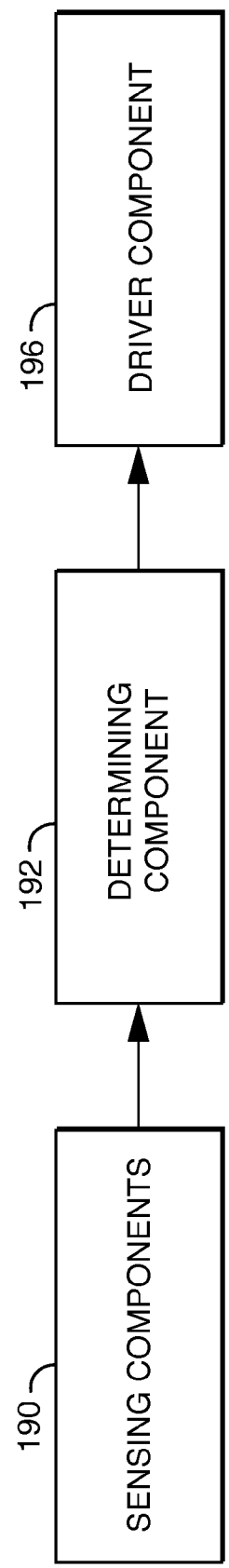
FIG. 4c is a block diagram of an alternative embodiment of a control scheme appropriate for an inlet valve according to the present invention.

A block diagram representation of another embodiment of the system of this invention is shown in FIG. 4c. The embodiment of the system of this invention shown in FIG. 4c includes one or more sensing components 190, a determining component 192, and a driver component 196. In one instance, the determining component capable of determining the one or more actuating signals includes analog/digital circuits including look-up tables, ADC and DAC circuits and drivers.

FIG. 5a depicts a normalized velocity profile for a primary cylinder piston of a two-piston, serial-flow pump, as would be observed during pump operation conforming to the normal delivery mode. The depiction assumes that the primary cylinder piston is provided with a mechanical linear drive and a motor which is independently controllable from the motor and mechanical linear drive associated with the accumulator cylinder piston. This general arrangement is found in commercially-available pumps, such as pumps sold by Waters Corporation (Milford, Mass.). Both the timebase and the piston velocity range depicted in FIG. 5a are normalized, as both quantities typically vary with variation in the commanded delivery flow rate of the pump. It should be recognized that the use of independent motor drives for the primary and accumulator pistons allows for a useful degree of decoupling between the motions of the primary and accumulator pistons, allowing the incorporation of a post-intake delay and other features as will be discussed further herein below.

Referring to FIG. 5a, the primary piston is initially observed at rest during a time interval 200. During this interval, the piston remains at top-dead-center ("TDC"), having completed the transfer of its cylinder contents to the accumulator. During an interval 210, the primary piston accelerates in a rearward direction, in order to decompress the liquid contents of the unswept volume of the primary cylinder, and thereby prepare for actual liquid intake. With either a passive or an active inlet valve, actual liquid intake into the primary cylinder cannot commence until the fluid contents of the unswept volume of the primary cylinder are decompressed to the substantially atmospheric pressure at which the intake manifold resides. During an interval 220, the primary piston has attained a programmed terminal velocity, which it will maintain throughout most of the remainder of the intake stroke. Depending upon operational parameters which include the pump delivery pressure and the prevailing solvent compressibility, the actual onset-of-intake of liquid into the primary cylinder may occur during the interval 210 or during the early part of the interval 220. As the piston approaches the commanded extent of its rearward travel, it undergoes a programmed deceleration as shown in interval 230, and is brought to rest, as shown in interval 240. This piston location corresponds to bottom-dead-center ("BDC") for the specified conditions of operation. Interval 240 corresponds to a post-intake delay, where the piston remains at rest, and where the pump is placed in readiness to commence solvent compression and delivery. Closure of the inlet check valve occurs at or shortly after the onset of interval 240. The primary piston then commences the first of two forward-directed moves intended to achieve controlled compression of the cylinder contents. The first move is indicated by the interval 250, and is typically an aggressive move intended to achieve coarse compression of the cylinder contents. The second forward-directed move occurs shortly thereafter, as indicated by the interval 260, and is intended to achieve a fine compression to a target pressure very close to the system delivery pressure. Correspondingly, this move is undertaken with lower piston velocity, allowing for a higher degree of control of cylinder pressure. Finally, during an interval 270, the primary-to-accumulator liquid transfer is performed. This is a move which is carefully coordinated with the motion of the accumulator piston so as to achieve a filling of the nearly-expended accumulator cylinder while also maintaining commanded solvent delivery to the downstream receiving system. At the end of interval 270, the primary piston is again at rest, at a position corresponding to TDC, having expelled its cylinder contents, but with delivery pressure remaining as a result of the liquid remaining in the unswept volume of the primary cylinder. The pump primary cycle thus wraps around and recommences at the interval indicated at 200.

FIG. 5b depicts the winding current applied to a voice coil actuator used to actuate an inlet valve constructed according to FIG. 1. It will be recalled that an important attribute of a voice coil actuator is that it produces a force which is related to the coil current (related in both magnitude and sign or polarity) by substantially a single constant of proportionality (the force constant), where the force constant is substantially independent of the axial position or displacement of the actuator, over a specified displacement range. The sign and magnitude of the voice coil current is commanded by the pump controller, such that the coil drive current and resulting actuation force is carefully coordinated with the primary pump cycle depicted in FIG. 5a.

Referring to FIG. 5b, the voice coil is initially provided with a small positive current during interval 300, which serves to maintain the actuator in a condition where the platen 46 of FIG. 1 is lightly energized against the solvent isolation element of 42 of FIG. 1. In this lightly-energized condition, referred to herein below as an "armed" condition, any gaps in the thrust path between the motor shaft and the flow determining component are closed. Gapping of the thrust path is substantially inevitable in a valve which has not undergone arming, due to the mechanical tolerance requirements of the overall assembly. Provision of an arming current effectively closes these gaps, while not imparting such a large upwardly-directed force that the flow determining component is unseated from its closed position. Appropriate arming thus substantially removes kinetic energy considerations which are important to certain prior art active inlet valve approaches, and enables the actuator to respond to an opening command with minimum time latency.

Referring again to FIG. 5b, a second interval 310 is associated with a rapid ramp-up of coil current to achieve opening of the inlet valve. The opening is timed to coincide with the depressurization of the primary cylinder to a pressure in the vicinity of atmospheric pressure, as measured by the pressure transducer associated with the primary cylinder. While the rate-of-rise of current in the coil is steep, the rate is limited such that the shape of the drive current profile is intentionally not rectangular. In one illustrative embodiment, the drive current profile is substantially trapezoidal. A rate-limited rise of coil current may be attained by providing an appropriate sequence of commanded current values, for example via the microprocessor 170 and driver component 176 of FIG. 4b. Alternatively, rate-limiting of the change of coil current may be achieved in a substantially passive manner by incorporating, for example, a bandwidth-limiting filter into the driver component. The blending of active and passive techniques to rate limit the change of coil current, in either a rising or a falling direction, is anticipated as being within the scope of this invention.

The reasoning underlying the choice to rate-limit the change of coil current is evident from the following considerations. Voice coil actuators typically exhibit much lower inductance, and lower inductive time-constant, than conventional solenoid counterparts. Also, the moving mass of the voice coil actuator is typically much less than that of the armature of a conventional solenoid. This situation is favorable in that the voice coil actuator motion can be configured with a relatively high degree of control. It is desirable to have the inlet check valve achieve initial opening with very little time-latency from the occurrence of the command signal or opening trigger. However, the rapid achievement of initial opening of the valve should not be confused with an extremely rapid and aggressive valve transit to the travel stop which is associated with the fully-open valve state. Diaphragm-isolated valves act as diaphragm pumps during their opening and closing movements, wherein the diaphragm motion creates an apparent transient source or sink of fluid current to or from fluid path proximal to the valve. A typical diaphragm-isolated valve as might be used in a chromatography pump application may displace 3 microliters of liquid during its transit from a fully-closed to a fully-open state, or from a fully-open to a fully-closed state. In an aggressive valve move, this displacement might occur in a timeframe of 3 milliseconds. The displacement of 3 microliters of liquid in a 3 millisecond timeframe (or 1 microliter per millisecond) corresponds to an overall mean transient flow rate of 60 milliliters per minute. The liquid intake paths of chromatography pumps are typically configured to support intake flow rates significantly less than 60 milliliters per minute. Due to the characteristic diameter and length of the solvent reservoir lines, a significant fluidic inertance, in addition to a fluidic resistance, may be presented by the intake path. A rapidly-opening diaphragm-isolated valve may source a peak transient fluid current of the order of 100 milliliters per minute into the pump intake path. The pump primary cylinder, which acts as a fluid current sink during primary intake, will typically aspirate or intake liquid at only a fraction of that flow rate. As a result, the excess fluid current sourced by the opening motion of the valve diaphragm will generate an aggressive excitation of the fluid column residing within the intake path leading back to the solvent reservoir. Specifically, the fluid column will be strongly accelerated in a direction antiparallel to the normal pump intake direction. This undesirable transient excitation of the liquid column will eventually decay, typically with a damped ringing response, which is measurable with a pressure transducer located within the intake path. During the excitation and decay process, quantitative delivery of mobile phase through one or more solvent inlet channels may be perturbed. Extreme excitation of the intake path has the potential to cause cavitation of the liquid. These conditions are particularly not conducive to the proper operation of low-pressure gradient formation systems.

Referring again to FIG. 5b, a reasonable voice coil drive profile may cause the valve to initially open (creating an initial separation between the flow determining component and the seat) with a latency of 1 millisecond or less, but will allow the remaining opening traverse to be accomplished over a time interval selected to encompass multiple milliseconds. In an exemplary embodiment, the remaining opening traverse may occupy 10 or more milliseconds. During this more prolonged valve traverse, the liquid being transiently sourced by the advancing valve diaphragm can be partially or fully aspirated by the pump primary cylinder intake demand, such that the effect of the valve isolation diaphragm motion on the fluid column residing within the solvent intake path is very nearly cancelled or nullified.

Referring again to FIG. 5b, an interval 320 is associated with maintaining the valve in a fully open state, with the valve actuator halted at its open-direction travel stop, throughout the remainder of the primary intake stroke. Throughout this interval, the voice coil maintains the flow determining component of the valve in an open position by overcoming the force of the preload spring. An interval 330 is timed to coincide with the post-intake delay of the primary cylinder, which is initiated immediately upon cessation of the rearward movement of the primary piston. As with the valve-opening coil current described for interval 310, the rate-of-change of the valve-closing coil current is limited so as to achieve a controlled rate of closure. During this closure interval, the limited rate-of-change of coil current allows a positive current corresponding to a bucking or braking force to be maintained against the preload spring, which is attempting to move the flow determining component of the valve to the closed position. The provision of this braking force, which decreases in a graded manner, achieves a limited rate of closure of the valve. As with the rate-of-opening of the valve, limitation of the rate-of-closure of the valve leads to a desirably low excitation imparted to the fluid column residing within the pump intake path. In practice, deceleration of the primary piston at the rearward end of stroke typically leaves a slight transient positive pressure in the pump intake manifold, due to fluid inertance (i.e. due to the deceleration required of the fluid column). This slight positive pressure transient will typically decay in a damped ringing response, in the absence of any valve diaphragm motion. With a rate-limited valve diaphragm motion present, closure of the valve results in a transient fluid current sink which can reduce the mild pressure overshoot associated with piston deceleration, and thereby further quiet the manifold pressure response during that phase of pump operation. An interval 340 is associated with returning the valve to its armed state, with the actuator and actuating element remaining lightly energized against the flow determining component. The valve can be maintained in this state until the pump is prepared to execute a subsequent primary intake cycle.

Following the above sequence, the voice coil actuator of the valve is always presented with a positive, non-zero current, the magnitude of which ensures that the drive mechanism is never allowed to gap. That is, even during closure of the valve, the valve actuator is still providing an upwardly-directed force. This behavior is in contrast to known prior art valves. Recognizing that even a lightly-energized arming condition results in a slight reduction of the net force applied to maintain the flow determining component in sealing engagement with the valve seat, it is an option to generate an additional coil current state as shown in FIG. 5b at 350. This state takes the coil current to zero (or potentially to a negative value), which allows the actuator to drop away from the armed condition. Thus, during the interval when the pump primary piston is seeking to achieve coarse compression of the primary cylinder contents, there is no unloading force being contributed by the actuator to the flow determining component of the valve. Once coarse compression is accomplished, there is typically ample hydraulic energization available to maintain the flow determining component of the valve in sealing engagement with the seat. Thus the arming condition can be reinstated at the actuator, in preparation for the subsequent intake cycle of the primary cylinder.

Figure 5C:
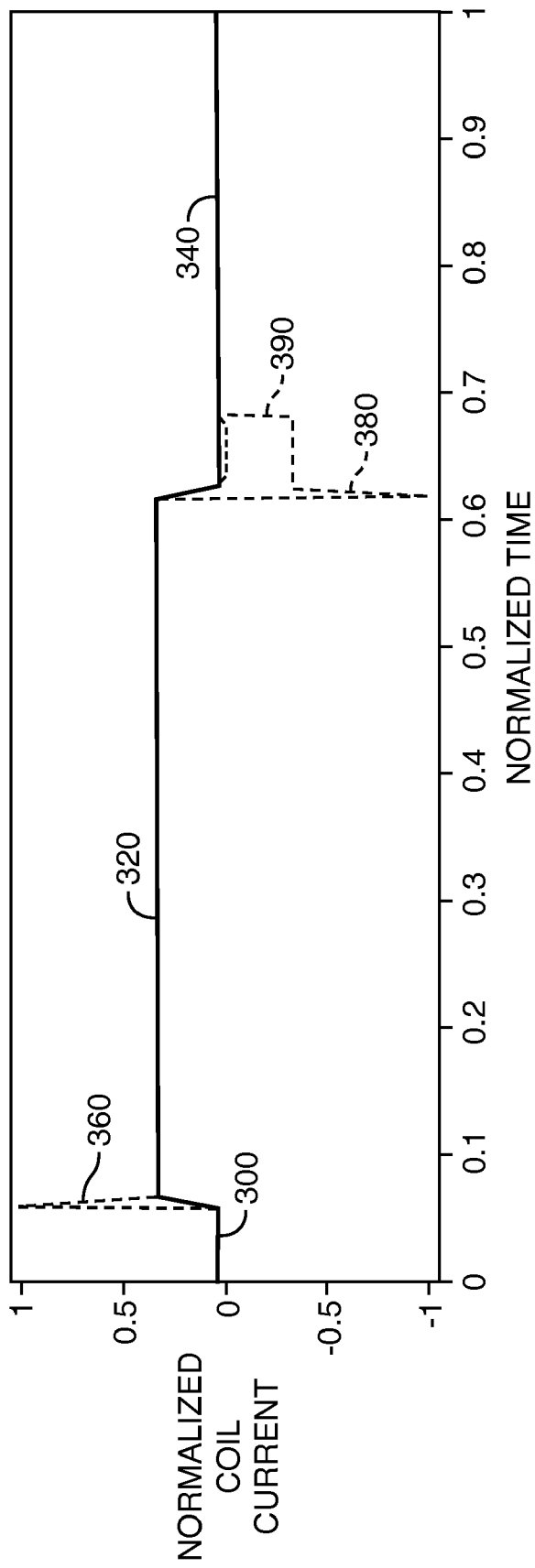

Referring to FIG. 5c, an alternate voice coil drive-current profile is illustrated. This drive-current profile takes advantage of the relatively low inductance and inductive time-constant of the voice coil actuator, and also takes advantage of the relatively low mass of the voice coil actuator, in order to produce a useful mode of operation of the inlet valve. A voice coil inductive time-constant in the range of 100 to 200 microseconds allows the assertion of an opening "boost" current during an interval 360. The duration of boost current assertion may be typically in the range of 200 to 500 microseconds. The boost current is supplied in order to achieve an initially high force to displace the flow determining component from its seated position in sealing engagement with the valve seat. The boost is asserted with the voice coil actuator in an armed condition, where any gaps in the thrust path are closed. The boost is terminated rapidly so that over-acceleration of the diaphragm does not occur. The boost current pulse is substantially a current impulse superimposed upon the trapezoidal profile of FIG. 5b. At the termination of the boost current pulse, the coil drive profile resumes the trapezoidal trajectory of FIG. 5. Provision of the boost current pulse attains an initial forceful dislodging of the flow determining element from the valve seat, providing a first increment of displacement. However, the boost current pulse does not result in a prolonged and sustained acceleration of the diaphragm, and therefore avoids the detrimental effects of excessive diaphragm velocity as relate to excitation of the fluid column in the intake manifold. A boost current pulse may optionally be supplied in the initial interval of valve closing, indicated at 380. The remaining aspects of the coil drive profile shown in FIG. 5c are substantially similar to the corresponding intervals shown in FIG. 5b.

FIG. 6 illustrates a coil drive-current profile as could be applied to the inlet valve as part of an initial power-on sequence of the pump, or as a dedicated diagnostic function outside of the normal pump delivery cycle. No corresponding primary piston velocity profile is shown, as the primary piston would normally be at rest during this interval of pump operation. The voice coil drive current, which is initially zero during an interval 400, is rapidly taken to a positive full-scale value during an interval 410, and is maintained at that value for an interval 420. For an inlet valve actuator initially at rest at the lower extreme of its stroke, the effect of this sequence is to aggressively accelerate the actuator in the valve-opening direction, closing any mechanical gaps, and subsequently forcefully opening the inlet valve. A similarly aggressive closing sequence is undertaken, commencing with an interval 430 where the coil current is transitioned to a negative full-scale value, and maintained there for an interval 440. A single cycle of this operation is terminated at a point 450, where the coil current is restored to a zero value.

As shown in FIG. 6, it is an option for the controller to execute two or more cycles of this type of valve-opening and valve-closing motion. Such cycling can be useful in freeing a valve which is in a substantially stuck-closed state as a result, for example, of a prolonged zero-flow or power-off condition of the pump.

Figure 7A:
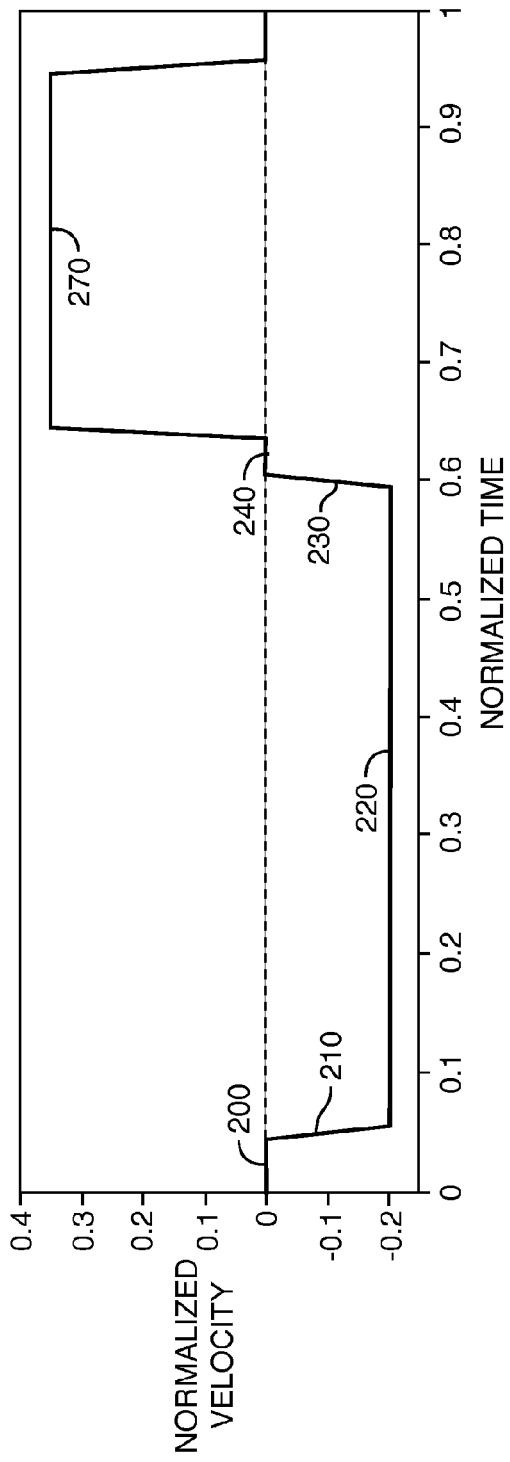
FIG. 7a is an illustration of a pump primary piston velocity profile typically representative of that utilized in the priming or flushing of a pump constructed according to any of FIGS. 3 and 4a-c, or as utilized within a diagnostic or other specialized mode of operation of a pump constructed according to any of FIGS. 3 and 4a-c.

FIG. 7a depicts a normalized primary piston velocity profile for a mode of pump operation termed "priming". A priming sequence may follow a power-on sequence, and may be used to establish an initial flow of liquid through the pump. A pump which has been idle for a prolonged period, or which has temporarily exhausted its solvent supply, may be only incompletely filled with liquid. In such a case, a priming sequence may be undertaken to flush the pump and restore a fully liquid-filled state appropriate for chromatographic delivery. Particularly when air or other gas is present in the pump, the sequence of piston motion as shown in FIG. 5a for the normal delivery mode may be supplanted by a simpler sequence which cycles the piston back-and-forth within the cylinder without regard to the establishment of particular compressional states.

Referring to FIG. 7a, intervals 200, 210, 220, 230, and 240 correspond, substantially identically, to the like-numbered intervals indicated in FIG. 5a, and result in a liquid-intake phase of pump primary cylinder operation. Following the post-intake delay 240, liquid expulsion from the primary occurs in an interval 270 (the primary-to-accumulator transfer) 270 without any intervening coarse-compression or fine-compression phases of operation.

Figure 7B:
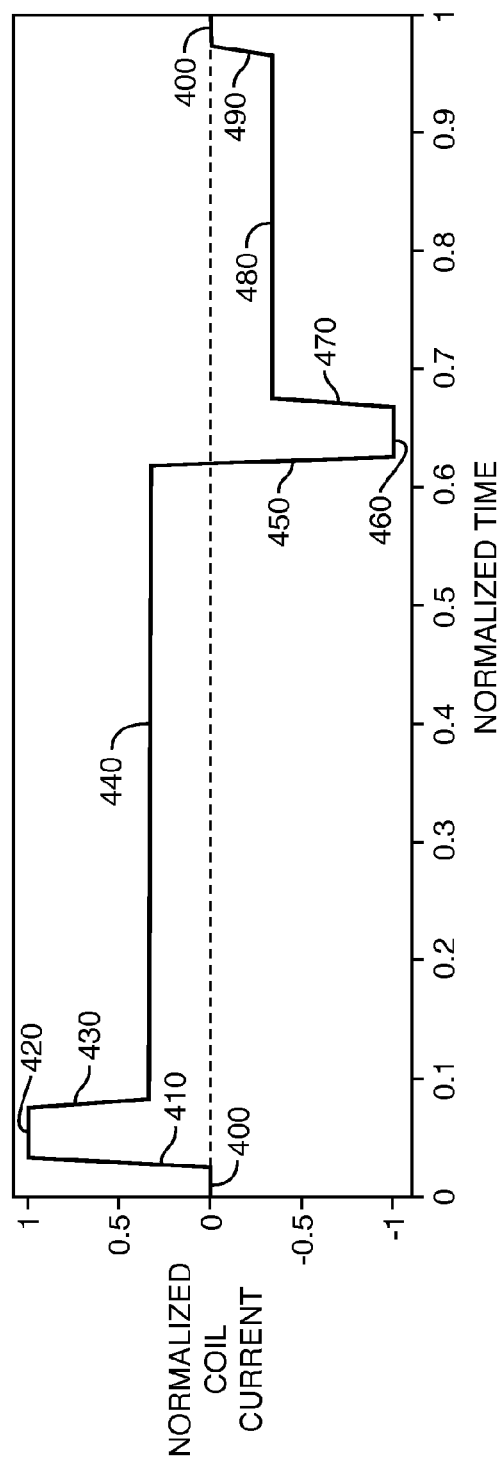
FIG. 7b is an illustration of a voice coil drive-current profile typically representative of that used in conjunction with the primary piston velocity profile illustrated in FIG. 7a for the priming or flushing of a pump constructed according to any of FIGS. 3 and 4a-c, or as utilized within a diagnostic or other specialized mode of operation of a pump constructed according to any of FIGS. 3 and 4a-c.

FIG. 7b depicts an illustrative voice coil drive-current profile as might be used in conjunction with the piston velocity profile of FIG. 7a. The profile shown does not utilize the actuator arming behavior depicted in FIG. 5b or 5c, but rather produces a direct valve-opening or valve-closing behavior timed to coincide with the intervals of primary pump operation where piston direction reversal is achieved. That is, the inlet valve is transitioned to an opened state when the pump primary piston motion is arrested at TDC, and the inlet valve is transitioned to a closed state when the pump primary piston motion is arrested at BDC.

The profile will typically include an interval 410 where the coil current is ramped rapidly up to a first positive value, which may be maintained over an interval 420. During an interval 430, the coil current is ramped down to a second positive value which sustains the inlet valve open for an interval 440. An interval 450 is used to transition the current to a first negative value, which is sustained over an interval 460. An interval 470 is used to transition the coil current to a second negative value which is maintained over an interval 480. An interval 490 is used to restore the coil current to zero in anticipation of a subsequent cycle of operation. Interval 410 coincides or corresponds in time with interval 200 of FIG. 7a, where the piston is at rest at TDC, and interval 450 corresponds in time with interval 240 of FIG. 7a, where the piston is at rest at BDC.

Figure 8:
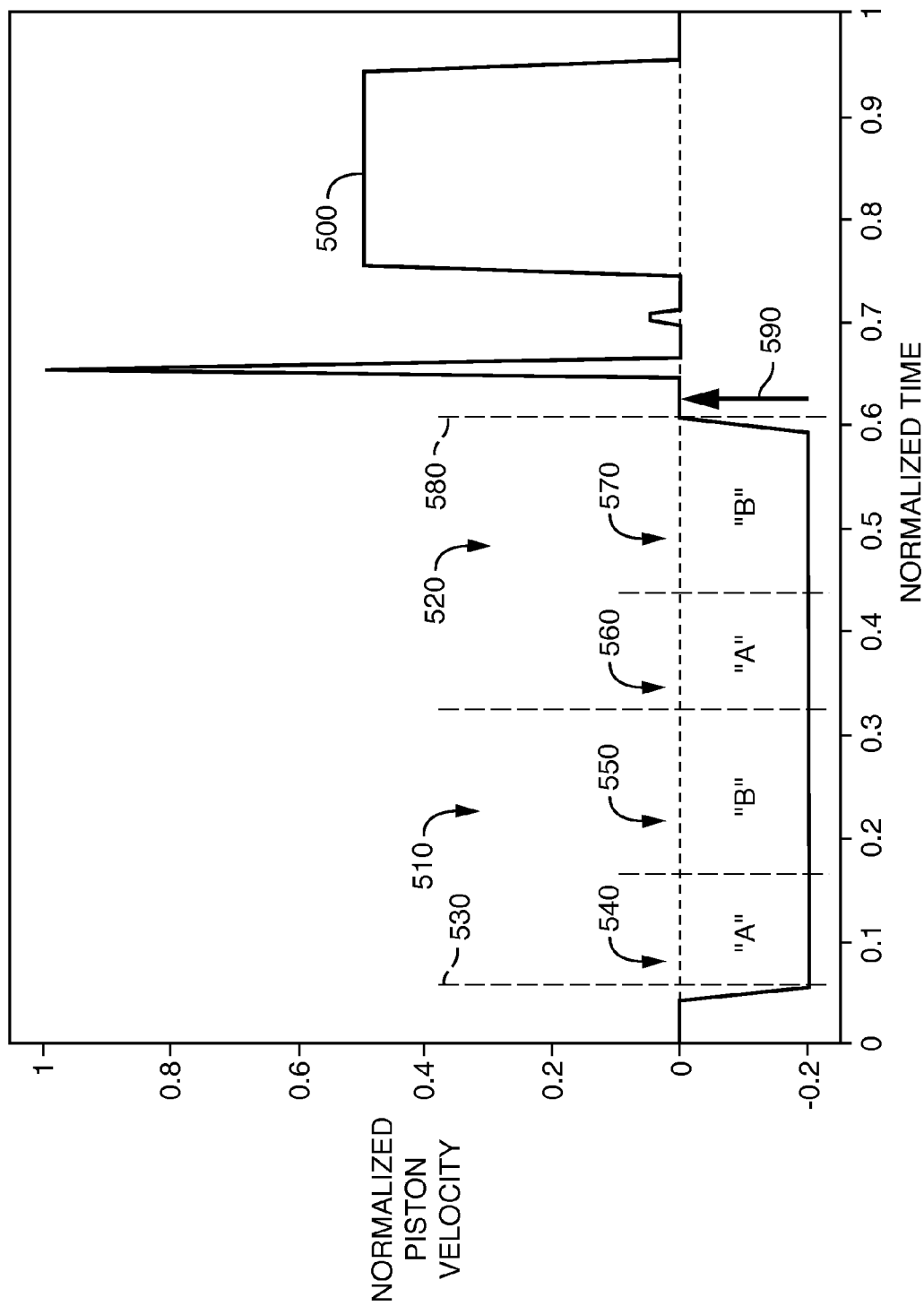
FIG. 8 is an illustration of a representative solvent intake map of a serial-flow pump constructed according to any of FIGS. 3 and 4a-c, when operated in a normal delivery mode which includes low-pressure solvent proportioning as part of its operation.

FIG. 8 is an illustration of a representative solvent intake map of a serial-flow pump constructed according to any of FIGS. 3 and 4a-c, when operated in a normal delivery mode which includes low-pressure solvent proportioning as part of its operation.

In a low-pressure solvent proportioning configuration, a solvent selection valve as shown at 88 in FIG. 3 is cycled in coordination with the intake of the pump primary cylinder in order to produce a commanded solvent composition mixture. Typically the form of the valve is a 3-channel or 4-channel proportioning valve incorporating independent solenoid actuators for the respective channels. In FIG. 8, a normalized pump primary piston velocity profile representative of that used during the normal delivery mode of the pump is shown, with markers superimposed to indicate the switching events or state transitions of the proportioning valve. In this illustrative embodiment, the generation of a two-component solvent mixture derived from constituent mobile phase solvents A and B is shown.

The primary piston velocity profile throughout one full cycle of pump operation is portrayed by a solid line 500. The intake phase of pump operation is divided into a first proportioning cycle 510 and a second proportioning cycle 520. The commencement of actual solvent intake into the pump primary cylinder occurs at a time indicated by 530, where rearward motion of the primary piston has decompressed the unswept volume of the primary cylinder to a pressure substantially equal to atmospheric pressure. Commanded opening of the primary cylinder inlet valve according to the present invention is coincident with this timepoint.

A first solvent composition will be generated during the first proportioning cycle 510 by controlling the proportioning valve so as to enable intake of mobile phase A during a sub-interval 540 and to enable intake of a mobile phase B during a sub-interval 550. A second solvent composition will be generated during the second proportioning cycle 520 by controlling the proportioning valve so as to enable intake of mobile phase A during a sub-interval 560 and to enable intake of a mobile phase B during a sub-interval 570.

The respective A and B channels of the proportioning valve may be enabled for specified intervals of time, or may be enabled for intervals which correspond to defined increments of piston displacement, typically inferred from the accumulated microstep count maintained by the pump controller for the piston-actuating step motor. Cessation of actual solvent intake by the pump primary cylinder occurs substantially when the piston velocity is commanded to zero. Motion of the diaphragm of diaphragm-isolated inlet valve causes an increment of fluid displacement within the pump intake manifold. When the inlet valve is actuated to a closed position, as at the end of the primary intake stroke, the retracting movement of the solvent isolation diaphragm causes an increment of excess mobile phase to be aspirated into the pump intake path, through the solvent proportioning valve channel which happens to be open when the inlet valve is closed. When the inlet valve is actuated to an open position, as at the onset of the primary intake stroke, the advancing movement of the solvent isolation diaphragm causes an increment of mobile phase to be expelled back into the intake path, through the solvent proportioning valve channel which happens to be open when the inlet valve is opened.

These increments of fluid displacement are not associated with pump primary piston motion, and if not accounted for properly, will create undesired solvent composition offset errors in the mobile phase mixture delivered by the pump to a receiving system. A further consideration is that substantially simultaneous motion of a primary inlet valve diaphragm and a solvent proportioning valve diaphragm can cause cross-coupling or cross-pumping effects which also lead to composition offset errors.

To address these problems, in a preferred mode of operation, a pump incorporating a diaphragm-isolated inlet valve according to the present invention will cause a proportioning valve transition at a timepoint 580 which enables the solvent channel which will be the leading solvent channel commanded for the next intake stroke. In the illustrative embodiment depicted in FIG. 8, a transition is effected at the proportioning valve at a timepoint 580, transitioning from solvent channel B to solvent channel A. This transition arms channel A such that it is in readiness for the onset of the next primary cylinder intake cycle. Closure of the primary inlet valve occurs shortly thereafter 590, still during the post-intake interval where the primary piston is at rest. Thus the closure of the primary inlet valve 590, and the subsequent opening of the primary inlet valve, both occur with the same solvent channel enabled. This enables a substantial cancellation of the diaphragm pumping effect of the primary inlet valve on solvent composition. The cancellation is achieved because the volume displaced by the diaphragm during the closing action of the valve is substantially the same as the volume displaced by the diaphragm during the opening action of the valve. Adequate cancellation of this pumping effect, to the level of nanoliters of volume, requires that the endpoints of the stroke of the isolation diaphragm remain substantially constant from stroke-to-stroke. This requirement is achieved by providing appropriate travel stops within the thrust path of the actuating mechanism, for both the valve-open and valve-closed directions. Performing the trailing-to-leading solvent channel switch at timepoint 580, in addition to enabling substantial cancellation of the inlet valve pumping effect upon solvent composition, also ensures that the only valve which is in motion at the onset of primary cylinder intake at timepoint 530 is the primary inlet valve, thereby avoid deleterious cross-coupling or cross-pumping effects.

Figure 9:
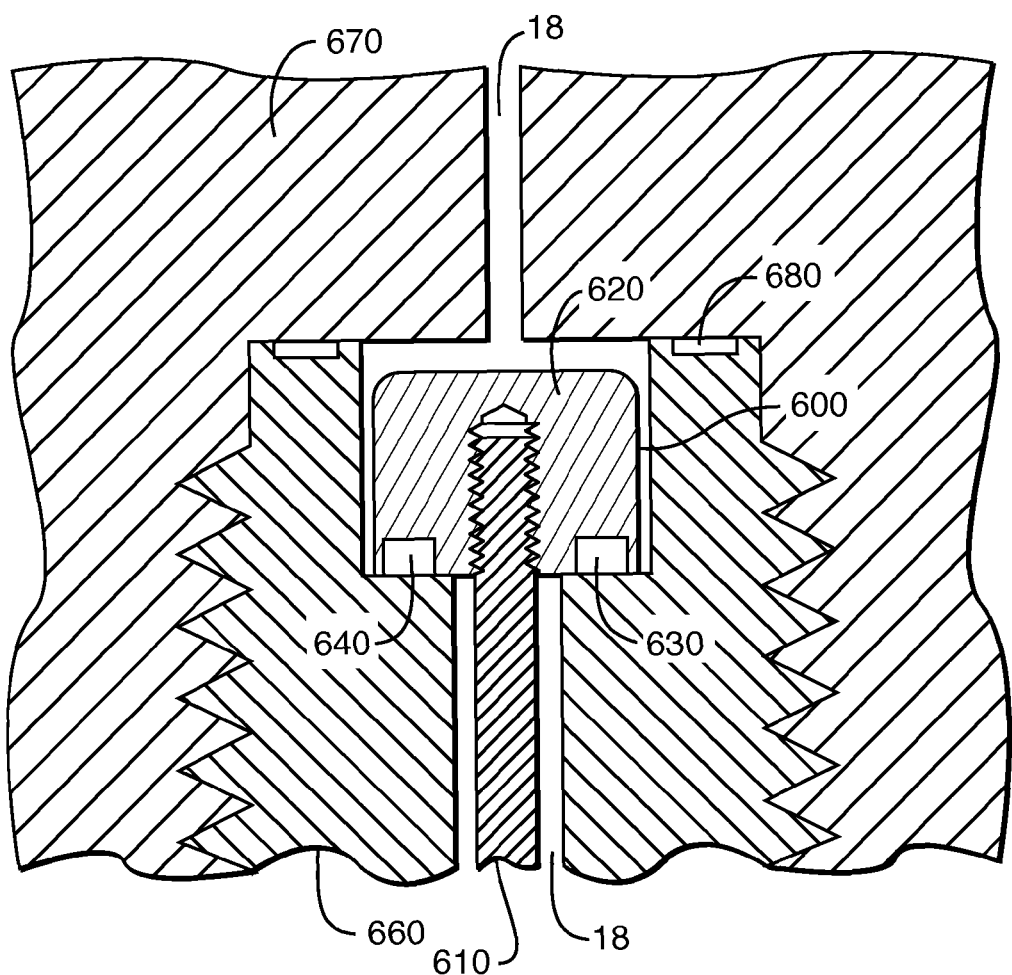
FIG. 9 is an illustration of an alternate embodiment of the flow determining component of an inlet valve according to the present invention.

FIG. 9 depicts an alternate embodiment of the flow determining component of a valve constructed according to the present invention. In this illustrative embodiment, flow determining component 600 is mechanically engaged (operatively connected) with actuating element 610 by way of a threaded engagement. Actuating element 610 is through-coupled to the voice coil motor shaft as shown in FIG. 2, such that actuating force can be applied by the voice coil motor to the flow determining component 600 in a bidirectional manner.

Flow determining component 600 is implemented as a substantially radially-symmetric poppet assembly. The poppet assembly includes a poppet body 620 and an annular sealing ring 630. The annular sealing ring material may be selected to be different from that of the poppet body. In an illustrative embodiment, the poppet body material is stainless steel, and the annular sealing ring material is a polyaryl-etherketone such PEEK poly-ether-ether-ketone (available from Victrex PLC, Lancashire, United Kingdom.) Examples of alternate sealing ring materials are poly-tetra-fluoro-ethylene (PTFE), tantalum, and gold.

Closure of the valve is attained by bringing poppet body 620, including sealing ring 630, into sealing engagement with a seat area 640. Seat area 640 is shown as being integral with that portion of the valve body in which fluid pathway 18 is generated. In an illustrative embodiment, seat area 640 is a machined feature generated within a stainless steel valve body 660. Alternatively, a dedicated seat area and seat material may be provided through the incorporation of additional parts.

The pump primary cylinder head is indicated at 670. The sealing interface between the valve body 660 and pump cylinder head 670 includes annular gasket 680. In the bidirectional operation of this embodiment, the seating or sealing engagement of poppet body 620 and sealing ring 630 against seat area 640 also provides the travel stop for the actuating mechanism when actuated in the valve-closing direction. The bidirectional force-generating capability of the voice coil motor eliminates the need for a preload spring or other passive biasing device to return the flow determining component 600 to the closed position. It is an option to include a passive biasing device, for example, to ensure a power-off closing behavior or a power-off opening behavior of the valve.

It should be noted that with a non-segmented pushrod arrangement as described above, the passive biasing device need not reside in the wetted solvent path of the valve, but can be implemented at a point of convenience anywhere along the thrust path. For example, the passive biasing device could be the suspension diaphragm of a diaphragm-suspended voice coil motor. The biasing force would arise from the restoring force provided by the suspension diaphragm, and thus the magnitude and direction of the biasing force would be determined within the design by appropriate selection of the resting (power-off) position of the diaphragm relative to its neutral or non-deflected position. In such an approach, the voice coil-generated force would be summed with the diaphragm-derived force during ongoing (powered) valve operation. In the absence of a passive biasing force, the voice coil motor would supply both the opening and the initial closing forces to the flow determining component 600.

The substantially nearly linear behavior of the positioning component allows the actuating force to be brought to bear on the flow determining component in a very graded manner. In one embodiment, the system of this invention includes one or more sensing components capable of sensing a displacement of the movable element 34 (or equivalently, of the actuator 38) and also capable of providing displacement information, means for determining the one or more actuating signals from the displacement information received from the one or more sensing components, and a driver component capable of providing the one or more actuating signals to the movable element 34. In one instance, the one or more sensing components are conventional displacement sensors, such as, but not limited to, capacitive sensors, LVDTs, eddy current sensors, photonic sensors. In one instance, the means for determining the one or more actuating signals include one or more processors and one or more computer usable media having computer readable code embodied therein, the computer readable code be capable of causing the one or more processors to receive displacement information from the one or more sensing components, determine the one or more actuating signals from the displacement information, and provide control information to the driver component. In another instance, the means for determining the one or more actuating signals include analog/digital circuits including look-up tables, A/D and D/A circuits and drivers. In another instance, a combination of the two preceding embodiments is used.

In another embodiment, the system of this invention includes one or more sensing components capable of sensing a rate of motion of the movable element 34 (or equivalently, of the actuator 38) and also capable of providing rate of motion information, means for determining the one or more actuating signals from the rate of motion information received from the one or more sensing components, and a driver component capable of providing the one or more actuating signals to the movable element 34. In one instance, the one or more sensing components are conventional rate of motion sensors. In one embodiment, the rate of motion is obtained from the back-EMF. (In one instance, the opening-motion transient, being detectable by back-emf, provides a basis to reduce the drive current and prevent over-travel in the open direction, or prevent ringing.) In one instance, the means for determining the one or more actuating signals include one or more processors and one or more computer usable media having computer readable code embodied therein, the computer readable code be capable of causing the one or more processors to receive rate of motion information from the one or more sensing components, determine the one or more actuating signals from the rate of motion information, and provide control information to the driver component. In another instance, the means for determining the one or more actuating signals include analog/digital circuits including look-up tables, A/D and D/A circuits and drivers. In another instance, a combination of the two preceding embodiments is used.

In the embodiment in which a fluid property (such as, but not limited to, cylinder pressure) is being monitored throughout the entire pump cycle, the valve of this invention is capable of various modes of operation. In one embodiment, the valve of this invention includes one or more sensing components capable of sensing a fluid property and also capable of providing fluid property information, means for determining the one or more actuating signals from the fluid property information received from the one or more sensing components, and a driver component capable of providing the one or more actuating signals to the movable element 34. In one instance, but not limited to, the fluid property is a pressure. In one instance, the means for determining the one or more actuating signals include one or more processors and one or more computer usable media having computer readable code embodied therein, the computer readable code be capable of causing the one or more processors to receive fluid property information from the one or more sensing components, determine the one or more actuating signals from the fluid property information, and provide control information to the driver component. In another instance, the means for determining the one or more actuating signals include analog/digital circuits including look-up tables, A/D and D/A circuits and drivers. In another instance, a combination of the two preceding embodiments is used.

In the three embodiments described hereinabove, the system of this invention includes one or more sensing components, means for means for determining the one or more actuating signals from the information received from the one or more sensing components, and a driver component capable of providing the one or more actuating signals to the movable element (for example 34, FIG. 1).

A schematic block diagram representation of an embodiment of the system of this invention is shown in FIG. 4b. The embodiment of the system of this invention shown in FIG. 4b includes one or more processors 170, one or more sensing components 172 (in a digital embodiment, the sensing components 172 provide the output as a digital signal), a computer usable medium (memory) 174 and a driver component 176. The computer usable memory 174 has computer readable code embodied therein that is capable of causing the one or more processors 170 to receive sensed information from the one or more sensing components, determine the one or more actuating signals from the sensed information, and provide control information to the driver component 176. The one or more sensing components 172, the one or more processors 170, the computer usable medium 174, and the driver component 176 are operatively connected by means of a connection component 178 (the connection component may be, for example, a computer buss, or a carrier wave).

With appropriate actuating signals, such as the embodiments disclosed hereinabove, a variety of embodiments of the method of this invention are possible. In one embodiment, the method of this invention for operating a valve includes holding a flow determining component in a position that closes a passageway between inlet and outlet of the valve, providing one or more actuating signals to a movable element of a linear motor, incrementally controlling, in a predetermined manner, movement of the movable element, the movement being incrementally controlled using the one or more actuating signals, contacting the flow determining component with an actuating element connected to the movable element and moving, as a result of the contact, the flow determining component away from the position that closes the passageway. In the mode of operation of the valve corresponding to this embodiment of the method, the movable element and associated actuating element (pushrod) are retracted away from the ball, allowing the fully-closed valve state in response to the ball preload spring. Retraction introduces a mechanical tolerance gap, or augments a pre-existing gap which may be produced from the static configuration of the de-energized system.

In one instance, the above embodiment also includes retracting the movable element and the actuating element connected thereto away from the flow determining component and moving, from the retracted position, in an incrementally controlled manner, the movable element until the actuating element connected thereto contacts the flow determining component. From the fully retracted position, the movable element and the actuating element connected thereto can be migrated substantially smoothly to a position in direct contact with the ball, thereby managing (closing) the backlash gap in a controlled manner, in preparation for subsequent moves.

The step of incrementally controlling in the predetermined manner the movement of the movable element can also include providing the one or more actuating opening signals to the movable element, the one or more actuating opening signals being capable of providing a force, transmitted by the actuating element in contact with the flow determining component, sufficient to place the flow determining component in a condition allowing flow. From the contacting position, the coil can be energized (providing one or more actuating signals) to provide a force allowing the valve to be opened in response to depressurization of the cylinder contents below a particular pressure threshold by creating a predetermined force balance condition.

In another instance, the condition allowing flow comprises a force balance such that the flow determining component moves to an open position in response to changes in fluid pressure. In the embodiment of the valve of this invention that includes one or more sensing components capable of sensing pressure and one or more processors, from a movable element/actuating element position in direct contact with the ball, a large actuation force can be applied to deterministically open the valve under processor control in response to measured depressurization (of the cylinder contents, as in FIG. 3), not relying upon a passive opening behavior in response to depressurization.

In yet another instance, the condition allowing flow comprises a force balance such that the flow determining component is held at an open position. In the valve embodiment shown in FIG. 1, from a nominal valve-open position (which may arise from a first increment of motion of the ball away from the seat), the movable element may be energized in order to cause the ball to overtravel away from the seat, to attain either a hard-stop stroke limit or a soft-stop (spring-determined) stroke limit, for the purpose of clearing air bubbles or debris from the valve sealing area, or for other diagnostic purpose.

In another embodiment, the step of incrementally controlling in the predetermined manner the movement of the movable element also includes the step of providing at least one actuating overtravel signal to the movable element, the at least one actuating overtravel signal being capable of providing a force, transmitted by the actuating element in contact with the flow determining component, sufficient to move the flow determining component to a limit position and/or the step of providing one or more positioning closing signals to the movable element, the one or more positioning closing signals being capable of causing the movable element, and the actuating element connected thereto, to move to a position at which the flow determining component does not allow flow. In the valve embodiment shown in FIG. 1, from either a nominal valve-open position or an over-traveled valve-open position, the valve ball may be returned to seat in a controlled manner, avoiding bounce or other secondary motion of the ball.

In yet another embodiment, besides causing over-travel to the limit position, the step of incrementally controlling in the predetermined manner the movement of the movable element further comprises the step of providing at least one positioning closing signal to the movable element, the at least one positioning closing signal being capable of causing the movable element, and the actuating element connected thereto, to move to a position at which the flow determining component does not allow flow.

In a further embodiment, the step of incrementally controlling in the predetermined manner the movement of the movable element comprises the steps of retracting the movable element and the actuating element connected thereto away from the flow determining component, and moving, from a retracted position, in an incrementally controlled manner, the movable element until the flow determining component is in an open position. In one instance, the incrementally controlled manner in which the movable element, and the actuating element connected thereto, is moved produces a force on the flow determining component that is greater than a steady state force acting on the movable element.

In the embodiment shown in FIG. 1, the above described embodiment of the method may be used to address a circumstance where the inlet check valve ball has become significantly stuck in its seat, or where there is diagnostic evidence that the valve is failing to close fully and therefore may have foreign particulate matter residing in the sealing area. From the retracted position, the movable element may be energized such that one or more cycles of aggressive motion are attempted between the fully-closed and fully-open positions. The presence of a backlash gap and the absence of kinetic energy damping components in the coupling between the actuator and the ball can allow an actuation force to be supplied transiently to the ball which significantly exceeds the steady-state force produced by the actuator, to aid in overcoming the stuck-closed condition. With regard to fouling of the sealing interface, it is known that sonication of check valve assemblies can be useful in dislodging foreign matter from the sealing surfaces. Cyclic operation of the above described embodiment of the method may be used to provide similar aggressive mechanical excitation to the ball-seat interface.

Each computer program may be implemented in a computer program product tangibly embodied in a computer-readable storage device for execution by a computer processor. Method steps of the invention may be performed by a computer processor executing a program tangibly embodied on a computer-readable medium to perform functions of the invention by operating on input and generating output.

Common forms of computer-readable (computer usable) media include, for example, a floppy disk, a flexible disk, hard disk, magnetic tape, or any other magnetic medium, a CDROM, any other optical medium, punched cards, paper tape, any other physical medium with patterns of holes or other patterns, a RAM, a PROM, and EPROM, a FLASH-EPROM, any other memory chip or cartridge, a carrier wave, such as electromagnetic radiation or electrical signals, or any other medium from which a computer can read.

It should be noted that, although in the embodiments presented hereinabove the valve of this invention has been applied in serial flow pumps, this invention is not limited to those illustrative applications. A variety of other applications, such as, but not limited to, parallel flow pumps and single piston pumps, are within the scope of this invention.

As mentioned above, some alternative embodiments of the invention include components having wear-resistant coatings. Such coatings—on surfaces that are subject to mechanical wear and wetted during operation—are helpful, for example, to reduce corrosion. Any suitable wear-resistant coating, including known coatings, may be employed. Some suitable coatings include diamond-related coatings such as coatings formed of polycrystalline diamond or DLC. DLC has, for example, good sliding resistance properties. Such coatings have any suitable thickness. For DLC, for example, a suitable thickness is in a range of, for example, approximately 1 µm to approximately 10 µm.

In some cases, such coatings are placed on components that are formed of a material that benefits from surface protection when immersed in an oxygen-deprived environment. For example, stainless steel, such as a common-grade 316 steel, is normally a corrosion-resistant material when used in valve or pump applications. The inherent corrosion resistance of this steel arises from the natural formation of a layer of chromium oxide on the surface of the metal, when exposed to oxygen. Passivation of stainless steel cleans the surface of contaminants that might inhibit this natural process.

Under certain circumstances, the chromium oxide layer can be stripped or worn away. A stainless steel in an oxygen-containing environment typically replenishes its corrosion-resistant oxide layer when the oxide layer is worn away. When the surface of the steel is deprived of oxygen, as in a solvent environment, the natural corrosion-resistant layer potentially fails to replenish itself. The exposed steel may then be prone to corrosion. For example, valve and pump components that are typically immersed in solvent can exhibit this corrosion behavior.

A coating material that is suitably resistant to wear thus optionally preserves the natural corrosion resistance of the underlying steel.

Suitable DLC coatings are produced by any suitable method, including known methods, such as ion-beam deposition and RF plasma deposition. Polycrystalline diamond coatings are produced by any suitable method, including known methods, such as chemical vapor deposition.

As noted above, various embodiments of the invention include parts having coatings. Such embodiments include valves, pumps, and other portions of chromatography apparatus that involve moving components. Merely by way of example, some coated components and surfaces include the following: valve actuating elements, such as the element 38; valve body or manifold surfaces, such as a valve seat and/or the surface of a cavity that contains a bobbin, poppet or other moving component; pump components, such as a pump cylinder-head surface, a pump poppet or piston, a pump seal, and or a pump cylinder. In one illustrative pump application, a high-pressure pump-seal back-up ring on a seal wash housing is protected from rubbing by a coating.

Coated components are protected from wear due to, for example, sliding, microscopic rubbing, vibration and/or impact; in turn, the coated surfaces are protected from fluidic environments that include, for example, a solvent or a mobile phase.

In view of the description provided herein, one having ordinary skill in the chromatography arts will recognize the advantageous application of coatings to surfaces of numerous types of components.

Although the invention has been described with respect to various embodiments, it should be realized this invention is also capable of a wide variety of further and other embodiments within the scope of this invention.

The invention claimed is:

1. A method for operating a valve, the method comprising the steps of:
Holding a flow determining component in a position that closes a passageway between an inlet and an outlet of the valve;
providing a plurality of actuating signals to a movable element of a linear motor;

incrementally controlling, in a predetermined manner, movement of the movable element, the movement being incrementally controlled using the plurality of actuating signals;

contacting the flow determining component with an actuating element connected to the movable element;

and moving, as a result of the contact, the flow determining component away from the position that closes the passageway;

wherein the valve is operated by a change in the position of the flow determining component, wherein incrementally controlling movement of the movable element comprises:

providing an arming signal to the movable element, said arming signal being capable of closing a gap in a thrust path between a motor shaft of the linear motor and the flow determining component while the flow determining component is held in the position that closes the passageway between the inlet and the outlet of the valve;

providing an actuating opening signal to the movable element, the actuating opening signal being capable of providing a force, transmitted by the actuating element in contact with the flow determining component, sufficient to place the flow determining component in a condition allowing flow; and limiting a rate-of-rise of the actuating opening signal so as to achieve a controlled rate of opening.

2. The method of claim 1 further comprising the step of: retracting the movable element and the actuating element connected thereto away from the flow determining component.

3. The method of claim 2 wherein the step of incrementally controlling in the predetermined manner the movement of the movable element comprises the step of: moving, from a retracted position, in an incrementally controlled manner, the movable element until the actuating element connected thereto contacts the flow determining component.

4. The method of claim 1 wherein the condition allowing flow comprises a force balance such that the flow determining component moves to an open position in response to changes in fluid pressure.

5. The method of claim 1 wherein the condition allowing flow comprises a force balance such that the flow determining component is held at an open position.

6. The method of claim 1 wherein the step of incrementally controlling in the predetermined manner the movement of the movable element further comprises the step of providing at least one actuating overtravel signal to the movable element, the at least one actuating overtravel signal being capable of providing a force, transmitted by the actuating element in contact with the flow determining component, sufficient to move the flow determining component to a limit position.

7. The method of claim 1 wherein the step of incrementally controlling in the predetermined manner the movement of the movable element further comprises the step of providing at least one positioning closing signal to the movable element, the at least one positioning closing signal being capable of causing the movable element, and the actuating element connected thereto, to move to a position at which the flow determining component does not allow flow.

8. The method of claim 1 wherein the step of incrementally controlling in the predetermined manner the movement of the movable element comprises the steps of: (a) retracting the movable element and the actuating element connected thereto away from the flow determining component; and (b) moving, from a retracted position, in an incrementally controlled manner, the movable element until the flow determining component is in an open position.

9. The method of claim 8 wherein the incrementally controlled manner produces a force acting on the flow determining, component that is greater than a steady state force.

10. The method of claim 8 wherein the predetermined manner of incrementally controlling the movement of the movable element further comprises the step of repeating steps (a) and (h) a predetermined number of repetitions.

11. The method of claim 1, wherein limiting the rate-of-rise of the actuating opening signal comprises limiting the rate-of-rise of the actuating opening signal such that the plurality of actuating signals have a signal profile that is not rectangular.

12. The method of claim 11, wherein the signal profile is substantially trapezoidal.

13. The method of claim 1, wherein the step of providing the actuating opening signal coincides with a depressurization of a pump cylinder.

14. The method of claim 1, wherein limiting the rate-of-rise of the actuating opening signal comprises providing a sequence of commanded current values.

15. The method of claim 1, wherein the step of incrementally controlling comprises the steps of:

providing the actuating opening signal, said actuating opening signal having a predetermined time duration and being capable of achieving opening of the valve;

providing an open state signal capable of maintaining the valve in a predetermined open state, said open state signal being of another predetermined time duration; and providing an actuating closing signal capable of achieving closing of the valve.

16. The method of claim 15, wherein the step of incrementally controlling comprises the step of:

limiting a rate-of-change of the actuating closing signal so as to achieve a controlled rate of closure.

17. The method of claim 15, further comprising the step of providing a second arming signal, after achieving closing of the valve, said second arming signal being capable of closing a gap in the thrust path between the motor shall of the linear motor and the flow determining component while the flow determining component is held in the position that closes the passageway between inlet and outlet of the valve, thereby enabling the movable element to respond to an opening command with reduced time latency.

* * * * *